(12) United States Patent
Jia

(10) Patent No.: US 11,836,903 B2
(45) Date of Patent: Dec. 5, 2023

(54) SUBJECT RECOGNITION METHOD, ELECTRONIC DEVICE, AND COMPUTER READABLE STORAGE MEDIUM

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 693 days.

(21) Appl. No.: 16/989,405

(22) Filed: Aug. 10, 2020

(65) Prior Publication Data
US 2021/0118150 A1  Apr. 22, 2021

(30) Foreign Application Priority Data
Oct. 16, 2019  (CN) .......................... 201910982347.3

(51) Int. Cl.
*G06T 5/50* (2006.01)
*G06T 7/194* (2017.01)
(Continued)

(52) U.S. Cl.
CPC ............ *G06T 5/50* (2013.01); *G06T 7/11* (2017.01); *G06T 7/194* (2017.01); *G06T 7/215* (2017.01);
(Continued)

(58) Field of Classification Search
USPC ........................................................ 382/103
See application file for complete search history.

(56) References Cited

U.S. PATENT DOCUMENTS 7,277,558 B2 * 10/2007 Sefcik .............. G08B 13/19608
348/169
7,995,116 B2 * 8/2011 Pillman .................. G06T 7/223
348/229.1

(Continued)

FOREIGN PATENT DOCUMENTS

CN        1973231 B       5/2010
CN      103733607 A       4/2014
(Continued)

OTHER PUBLICATIONS

International Search Report for PCT Application No. PCTCN2020121191 dated Jan. 14, 2021.
(Continued)

*Primary Examiner* — Ishrat I Sherali
(74) *Attorney, Agent, or Firm* — Young Basile Hanlon & Macfarlane, P.C.

(57) ABSTRACT

This present disclosure relates to a subject recognition method and apparatus, an electronic device, and a computer-readable storage medium. The method includes: obtaining a current image frame and detecting whether there is a moving subject in the current image frame; when there is no moving subject in the current image frame, obtaining a motion state transition condition; when the current image frame satisfies the motion state transition condition, obtaining a target subject in a previous image frame; and determining a target subject in the current image frame based on the target subject in the previous image frame.

19 Claims, 10 Drawing Sheets

(51) Int. Cl.
  G06T 7/215 (2017.01)
  G06T 7/11 (2017.01)
  G06T 7/246 (2017.01)
  G06T 7/269 (2017.01)
  G06T 7/73 (2017.01)
  G06V 20/40 (2022.01)
  G06V 10/20 (2022.01)
  G06V 10/10 (2022.01)
  G06V 10/147 (2022.01)
  G06V 10/22 (2022.01)
  G06V 10/62 (2022.01)

(52) U.S. Cl.
  CPC .............. G06T 7/246 (2017.01); G06T 7/269 (2017.01); G06T 7/73 (2017.01); G06V 10/255 (2022.01); G06V 20/46 (2022.01); G06V 20/48 (2022.01); G06V 20/49 (2022.01); *G06T 2207/10016* (2013.01); *G06V 10/10* (2022.01); *G06V 10/147* (2022.01); *G06V 10/22* (2022.01); *G06V 10/62* (2022.01); *G06V 2201/07* (2022.01)

(56) References Cited

U.S. PATENT DOCUMENTS

| | | | |
|---|---|---|---|
| 8,593,534 | B2 | 11/2013 | Gardiner et al. |
| 9,025,825 | B2* | 5/2015 | Saund ................ G06T 7/246 382/103 |
| 10,055,852 | B2* | 8/2018 | Shimada ............... G06T 7/73 |
| 2003/0099375 | A1* | 5/2003 | Sefcik ............. G08B 13/19697 382/103 |
| 2009/0185760 | A1 | 7/2009 | Okada et al. |
| 2009/0245684 | A1 | 10/2009 | Makii |
| 2010/0118156 | A1 | 5/2010 | Saito |
| 2014/0146182 | A1 | 5/2014 | Endo |
| 2014/0334668 | A1 | 11/2014 | Saund |
| 2017/0223275 | A1 | 8/2017 | Yanagisawa |
| 2017/0237904 | A1* | 8/2017 | Takahashi ............... G06T 5/50 348/208.1 |
| 2017/0272661 | A1 | 9/2017 | Tsubusaki |
| 2017/0287144 | A1 | 10/2017 | Shimada |
| 2018/0278737 | A1 | 9/2018 | Posa |
| 2022/0222830 | A1* | 7/2022 | Jia ......................... G06V 10/62 |

FOREIGN PATENT DOCUMENTS

| | | |
|---|---|---|
| CN | 104282020 A | 1/2015 |
| CN | 104835178 A | 8/2015 |
| CN | 106161919 A | 11/2016 |
| CN | 106210495 A | 12/2016 |
| CN | 205883405 U | 1/2017 |
| CN | 104573715 B | 7/2017 |
| CN | 104469167 B | 10/2017 |
| CN | 106686308 B | 2/2018 |
| CN | 108170817 A | 6/2018 |
| CN | 108900778 A | 11/2018 |
| CN | 109089047 A | 12/2018 |
| CN | 105847664 B | 1/2019 |
| CN | 109167910 A | 1/2019 |
| CN | 109753975 A | 5/2019 |
| CN | 109993778 A | 7/2019 |
| CN | 110096935 A | 8/2019 |
| CN | 110222652 A | 9/2019 |
| CN | 110796041 A | 2/2020 |
| KR | 1020110007806 A | 1/2011 |

OTHER PUBLICATIONS

European Search Report for Application No. 20195707.3 dated Mar. 4, 2021.
Indian Examination Report for IN Application 202014038471 dated Aug. 4, 2021. (6 pages).
Chinese Office Action with English Translation for CN Application 201910982347.3 dated Feb. 14, 2023. (17 pages).

* cited by examiner

SUBJECT RECOGNITION METHOD, ELECTRONIC DEVICE, AND COMPUTER READABLE STORAGE MEDIUM

CROSS-REFERENCE TO RELATED APPLICATION(S)

This application is based on and claims priority to Chinese Patent Application Serial No. 201910982347.3, filed on Oct. 16, 2019, the entire contents of which are incorporated herein by reference.

TECHNICAL FIELD

The present disclosure relates to a field of imaging technologies, and more particularly, to a subject recognition method, an electronic device and a computer readable storage medium.

BACKGROUND

With development of imaging technologies, people get accustomed to shooting images or videos through image acquisition devices such as cameras on electronic devices to record various information. The camera needs to detect a subject during image acquisition process, but the subject often changes between a motion state and a stationary state when a video is shot, which may lead to inaccurate detection of the subject during transition between the motion state and the stationary state.

SUMMARY

Embodiments of the present disclosure provide a subject recognition method, an electronic device and a computer readable storage medium.

The subject recognition method includes: obtaining a current image frame and detecting whether there is a moving subject in the current image frame; in response to detecting that there is no moving subject in the current image frame, obtaining a motion state transition condition; when the current image frame satisfies the motion state transition condition, obtaining a target subject in a previous image frame; and determining a target subject in the current image frame based on the target subject in the previous image frame.

The electronic device includes a memory and a processor. A computer program is stored in the memory, and when the computer program is executed by the processor, the processor is caused to execute the followings: obtaining a current image frame and detecting whether there is a moving subject in the current image frame; in response to detecting that there is no moving subject in the current image frame, obtaining a motion state transition condition; when the current image frame satisfies the motion state transition condition, obtaining a target subject in a previous image frame; and determining a target subject in the current image frame based on the target subject in the previous image frame.

The computer-readable storage medium has a computer program stored thereon. When the computer program is executed by a processor, the processor is caused to execute the followings: obtaining a current image frame and detecting whether there is a moving subject in the current image frame; in response to detecting that there is no moving subject in the current image frame, obtaining a motion state transition condition; when the current image frame satisfies the motion state transition condition, obtaining a target subject in a previous image frame; and determining a target subject in the current image frame based on the target subject in the previous image frame.

BRIEF DESCRIPTION OF DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

In order to make the purpose, technical solution and advantages of the present disclosure clear, the present disclosure is described in further detail in combination with the accompanying drawings and embodiments. It should be understood that the specific embodiments described herein are only used to explain the present disclosure, and are not used to limit the present disclosure.

It is understood that the terms such as "first", and "second", used in this disclosure may be used herein to describe various elements, but these elements are not limited by these terms. These terms are only used to distinguish a first element from other element. For example, without departing from the scope of the present disclosure, the first pixel value vector may be referred to as the second pixel value vector, and similarly, the second pixel value vector may be referred to as the first pixel value vector. Each of the first pixel value vector and the second pixel value vector refers to a pixel value vector, but they are not the same pixel value vector.

Figure 1:
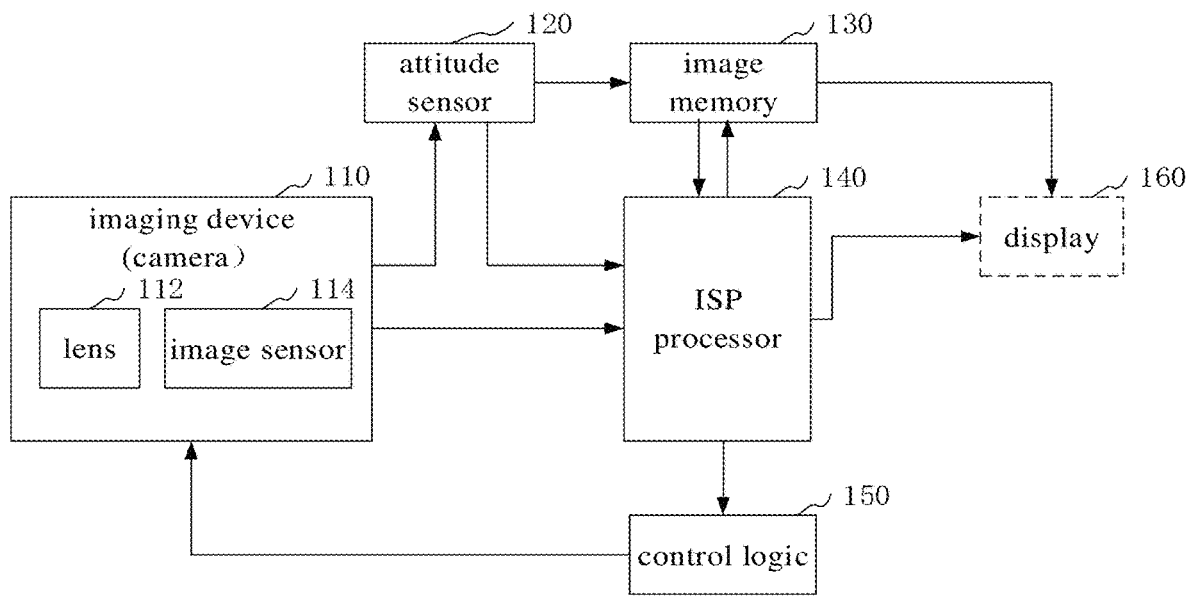
FIG. 1 is a schematic diagram of an image processing circuit according to an embodiment of the present disclosure.

The embodiment of the present disclosure provides an electronic device. The electronic device includes an image processing circuit. The image processing circuit may be implemented by hardware and/or software components, including various types of processing units defining image signal processing (ISP) pipelines. FIG. 1 is a schematic diagram of an image processing circuit according to an embodiment of the present disclosure. As illustrated in FIG. 1, for convenience of explanation, only aspects of the image processing technique related to the embodiment of the present disclosure are illustrated.

As illustrated in FIG. 1, the image processing circuit includes an ISP processor 140 and a control logic 150. The image data captured by an imaging device 110 is processed by the ISP processor 140. The ISP processor 140 analyzes the image data to capture image statistical information that can be used to determine one or more control parameters of the imaging device 110. The imaging device 110 may include a camera having one or more lenses 112 and an image sensor 114. The image sensor 114 may include a color filter array (e.g., a Bayer filter). The image sensor 114 may obtain light intensity and wavelength information captured by each imaging pixel of the image sensor 114 and provide a set of original image data that may be processed by the ISP processor 140. An attitude sensor 120 (e.g., a three-axis gyroscope, a Hall sensor, and an accelerometer) may provide the ISP processor 140 with image processing parameters (e.g., anti-shake parameters) based on a type of an interface of the attitude sensor 120. The interface of the attitude sensor 120 may use a standard mobile imaging architecture (SMIA) interface, other serial or parallel camera interface, or a combination of the above interfaces.

In addition, the image sensor 114 may also send the original image data to the attitude sensor 120. The attitude sensor 120 may provide the original image data to the ISP processor 140 based on the type of the interface of the attitude sensor 120, or the attitude sensor 120 may store the original image data to an image memory 130.

The ISP processor 140 processes the original image data pixel by pixel in various formats. For example, each image pixel may have a bit depth of 8, 10, 12, or 14 bits, and the ISP processor 140 may perform one or more image processing operations on the original image data and collect statistical information about the image data. The image processing operations may be performed with the same or different precision in the bit depth.

The ISP processor 140 may also receive image data from the image memory 130. For example, the interface of the attitude sensor 120 sends the original image data to the image memory 130, and the original image data in the image memory 130 is provided to the ISP processor 140 for processing. The image memory 130 may be a part of a memory device, a storage device, or an individual dedicated memory in an electronic device, and may include direct memory access (DMA) features.

When receiving the original image data from the interface of the image sensor 114 or from the interface of the attitude sensor 120 or from the image memory 130, the ISP processor 140 may perform one or more image processing operations, such as time-domain filtering. The processed image data is sent to the image memory 130 for further processing before being displayed. The ISP processor 140 receives the processed data from the image memory 130, and performs image data processing on the processed data in an original domain and in a RGB and YCbCr color space. The image data processed by the ISP processor 140 may be output to a display 160 for viewing of a user and/or further processing of a graphics engine or a graphics processing unit (GPU). In addition, outputs of the ISP processor 140 may also be sent to the image memory 130, and the display 160 may read the image data from the image memory 130. In an embodiment, the image memory 130 may be configured to implement one or more frame buffers.

The statistical data determined by the ISP processor 140 may be sent to the control logic 150. For example, the statistical data may include statistical information of the image sensor 114 such as vibration frequency of the gyroscope, automatic exposure, automatic white balance, automatic focusing, flicker detection, black level compensation, and shading correction of the lens 112. The control logic 150 may include a processor and/or a microcontroller that executes one or more routines (such as firmware). The one or more routines may determine control parameters of the imaging device 110 and the ISP processor 140 based on the received statistical data. For example, the control parameters of the imaging device 110 may include control parameters of the attitude sensor 120 (such as gain, integration time of exposure control, and anti-shake parameters), flash control parameters of the camera, anti-shake displacement parameters of the camera, and control parameters of the lens 112 (such as focal length for zooming or focusing), or a combination of these parameters. The control parameters of the ISP processor 140 may include gain levels and color correction matrices used for automatic white balance and color adjustment (e.g., during RGB processing), and shading correction parameters of the lens 112.

In an embodiment, the current image frame is acquired through the lens 112 and the image sensor 114 in the imaging device (camera) 110, and the current image frame is sent to the ISP processor 140. After receiving the current image frame, the ISP processor 140 detects whether there is a moving subject in the current image frame. The ISP processor 140 acquires a motion state transition condition when it is detected that there is no moving subject in the current image frame, and further detects whether the current image frame satisfies the motion state transition condition. When it is detected that the current image frame satisfies the motion state transition condition, the ISP processor 140 acquires a target subject in the previous image frame and determines the target subject in the current image frame based on the target subject in the previous image frame. In this way, the target subject may be obtained more accurately, thus improving the accuracy of subject identification.

After acquiring the target subject in the current image frame, the ISP processor sends the target subject to the control logic 150. After the target subject is acquired, the control logic 150 controls the lens 112 in the imaging device (camera) 110 to move to focus on a position corresponding to the target subject, so that a next image frame of the target subject is obtained and more distinct, and the next image frame is sent to the ISP processor 140. After receiving the next image frame, the ISP processor 140 uses the current image frame as the previous image frame and the next image frame as the current image frame, and detects whether there is a moving subject in the current image frame. When there is no moving subject in the current image frame, the moving state transition condition is acquired. When the current image frame satisfies the moving state transition condition, the target subject in the previous image frame is acquired, and the target subject in the current image frame is determined based on the target subject in the previous image frame. In this way, a target video with the clearer and clearer target subject may be generated.

Figure 2:
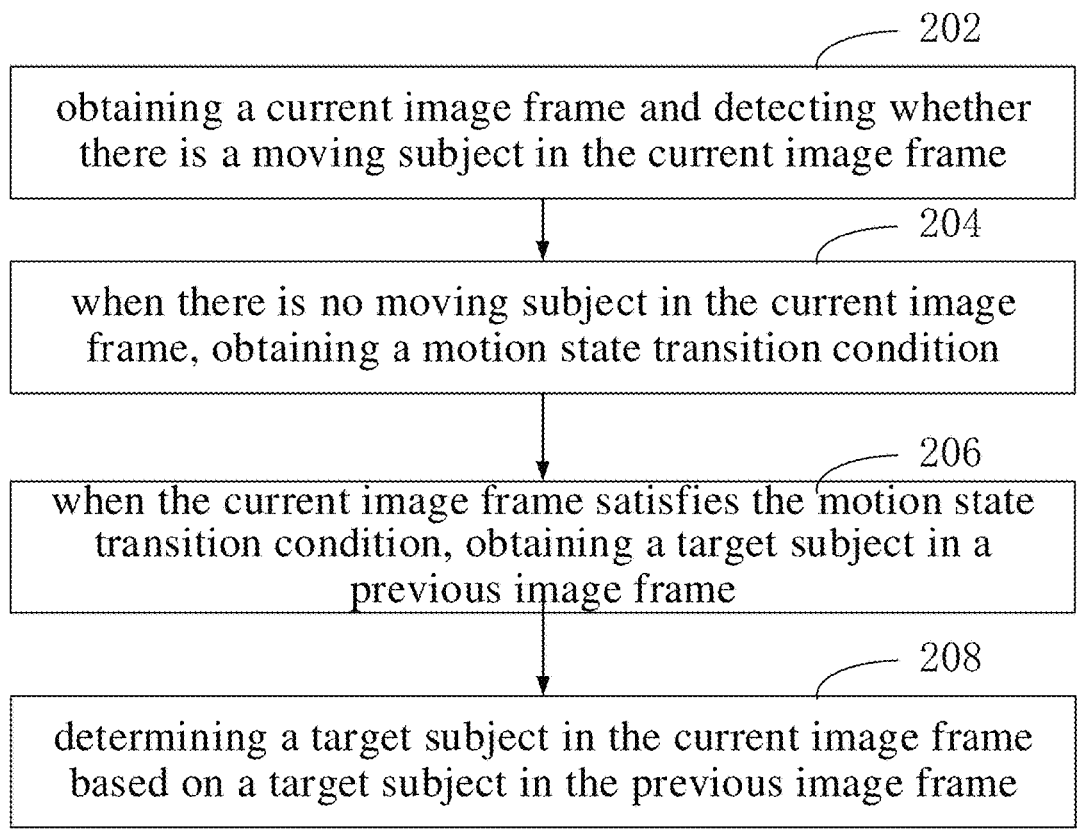
FIG. 2 is a flowchart of a subject recognition method according to an embodiment of the present disclosure.

FIG. 2 is a flowchart of a subject recognition method according to an embodiment of the present disclosure. As illustrated in FIG. 2, the subject recognition method includes the followings.

At block 202, a current image frame is obtained and it is detected whether there is a moving subject in the current image frame.

The current image frame refers to an image acquired at a current moment. The current image frame may be any one of RGB (Red, Green, Blue) images, grayscale images, depth images, and an image corresponding to a Y component in a YUV image. "Y" in the YUV image represents brightness (Luminance or Luma), i.e., grayscale value, "U" and "V" represent chromaticity (Chrominance or Chroma), which is used to describe the image color and saturability, and to specify the color of a pixel. Moving subject refers to a subject in a motion state.

In detail, the ISP processor of the electronic device acquires the current image frame, and filters the current image frame to remove noise. The ISP processor may detect whether there is a moving subject in the current image frame after denoising.

At block 204, when there is no moving subject in the current image frame, a motion state transition condition is obtained.

The motion state transition refers to that the moving subject is transferred from a motion state to a stationary state.

In detail, when the ISP processor of the electronic device detects that there is no moving subject in the current image frame, the ISP processor may acquire the motion state transition condition. Further, the motion state transition condition includes following conditions that: there is no moving subject in the current image frame, a ratio of a subject dividing image of a previous image frame to the previous image frame is greater than a ratio threshold, and there is a moving subject in the previous image frame.

At block 206, when the current image frame satisfies the motion state transition condition, a target subject in a previous image frame is obtained.

The previous image frame refers to an image adjacent to the current image frame and acquired at a previous moment. The previous image frame may be any one of RGB (Red, Green, Blue) images, grayscale images, depth images, and an image corresponding to the Y component in a YUV image.

In detail, the ISP processor of the electronic device detects whether the current image frame satisfies the motion state transition condition. When the ISP processor detects that the current image frame satisfies the motion state transition condition, the ISP processor acquires the target subject in the previous image frame.

In this embodiment, the current image frame and the previous image frame are captured by the electronic device. The electronic device may be provided with one or more cameras, for example, one, two, three, or five cameras, which is not limited here. The form of the camera in the electronic device is not limited, for example, the camera may be a camera built in the electronic device or a camera external to the electronic device. Moreover, the camera may be a front camera or a rear camera.

The current image frame and the previous image frame may be captured by the same camera in the electronic device, or may be captured by different cameras, which is not limited herein. The camera on the electronic device may be any type of camera. For example, the camera may be a color camera, a black-and-white camera, a depth camera, a telephoto camera, or a wide-angle camera, which is not limited herein.

Correspondingly, a color image is obtained through a color camera, that is, an RGB image. A grayscale image is obtained through a black-and-white camera, a depth image is obtained through a depth camera, a telephoto image is obtained through a telephoto camera, and a wide-angle image is obtained through a wide-angle camera. The cameras in the electronic devices may be the same type or different types of cameras. For example, the cameras may all be color cameras or black and white cameras; one of the cameras may be a telephoto camera, and other cameras may be wide-angle cameras, which is not limited herein.

In detail, the electronic device may store the captured images in a first-in first-out queue in sequence according to shooting times of the images, and obtain the current image frame and the previous image frame from the first-in first-out queue.

The first-in first-out queue means that the images stored firstly are taken out firstly. The electronic device first obtains the previous image frame from the first-in first-out queue, and then obtains the current image frame from the first-in first-out queue.

In another embodiment, a current shooting time and a previous shooting time are obtained, the current image frame is obtained according to the current shooting time, and the previous image frame is obtained according to the previous shooting time.

The electronic device can obtain the current shooting time and a shooting frequency. The previous shooting time may be obtained according to the current shooting time and the shooting frequency. For example, if the current shooting time is 15:45:56.200 and the shooting frequency is 10 frames/s, that is, one image frame is shot every 100 ms, then the previous shooting time is 15:45:56.100. The current image frame is obtained according to the current shooting time, and the previous image frame is obtained according to the previous shooting time.

In an embodiment, the current image frame and the previous image frame are down-sampled to obtain the current image frame having a smaller size and the previous image frame having a smaller size, thereby saving the computation of computer processing.

In an embodiment, the current image frame and the previous image frame are filtered, to filter out high frequency noise carried in a complex background containing a lot of texture details in the current image frame and the previous image frame, or high frequency noise caused by down-sampling, such that the more accurate current image frame and the more accurate previous frame can be obtained, thereby preventing misdetection of the subject detection. The filtering processing may be at least one of Gaussian filtering, smoothing filtering, and bilateral filtering. Down-sampling refers to sampling the pixel every few pixels in the image to obtain a new image.

At block 208, a target subject in the current image frame is determined based on the target subject in the previous image frame.

In detail, the ISP processor of the electronic device acquires the target subject in the previous image frame, and predicts a subject area in the current image frame based on the target subject in the previous image frame. The subject area in the current image frame is input into a subject dividing network to obtain the target subject in the current image frame. The subject dividing network refers to a network for obtaining a subject by dividing the input image area.

It is understood that in a conventional subject detection method, when the camera moves or an object to be shot moves, it is difficult to detect the subject in the image or the detected subject is inaccurate.

With the image recognition method in this embodiment, by acquiring the current image frame, detecting whether there is a moving subject in the current image frame, obtaining the motion state transition condition when there is no moving subject in the current image frame, obtaining the target subject in the previous image frame when the current image frame satisfies the motion state transition condition, and determining the target subject in the current image frame based on the target subject in the previous image frame, the target subject may be obtained more accurately, such that the accuracy of subject identification is improved.

Figure 3:
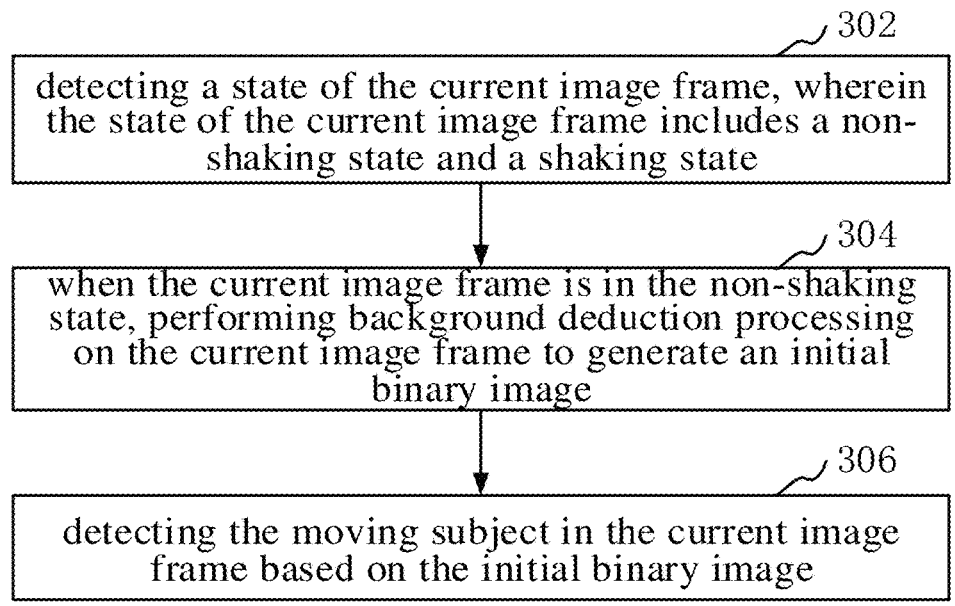
FIG. 3 is a flowchart of a process of detecting whether there is a moving subject in a current image frame according to an embodiment of the present disclosure.

In an embodiment, as illustrated in FIG. 3, detecting whether there is a moving subject in the current image frame includes the followings.

At block 302, a state of the current image frame is detected. The state of the current image frame includes a non-shaking state and a shaking state.

In detail, the ISP processor of the electronic device may detect the state of the current image frame to determine whether the current image frame is in the shaking state or the non-shaking state.

At block 304, when the current image frame is in the non-shaking state, background deduction processing is performed on the current image frame to generate an initial binary image.

Background deduction processing is a moving object detecting algorithm. The basic idea is to use a background parameter model to approximate pixel values of a background image, and to perform differential comparison on the current image frame and the background image to realize detection of a moving area. The pixel area with a larger difference is regarded as the moving area (subject area), and the pixel area with a smaller difference is regarded as a background area. Binary image means that the pixel value of the pixel contained in the image is expressed by one of two numerical values. For example, the two numerical values may be 0 and 255, in which the pixel value of the pixel contained in the moving subject is set to 0, and the pixel value of the pixel contained in other areas in the current image frame is set to 255. The two numerical values may also be 0 and 1, or other values, which is not limited herein.

In detail, when the current image frame is in the non-shaking state, the ISP processor of the electronic device performs the background deduction processing on the current image frame to obtain the initial binary image.

In this embodiment, performing the background deduction processing on the current image frame includes performing background detection on the current image frame through a background detection model to obtain the initial binary image. The initial binary image includes a background area and a subject area. The differential processing is performed on the current image frame and the background area in the current image frame, and the subject area in the current image frame is determined according to the differential result. The differential result refers to the result obtained after the differential processing. The differential result may be one or more subjects. It is understood that there are a background area and a subject area in the current image frame. The differential processing is performed on the current image frame and the background area in the current image frame, and the subject area in the current image frame can be determined according to the differential result.

The background detection model includes a first background detection model and a second background detection model. When the first background detection model is used to perform background detection on the current image frame, the second background detection model is a candidate background detection model. When the second background detection model is used to perform background detection on the current image frame, the first background detection model is a candidate background detection model. Each of the first background detection model and the second background detection model can be a single Gaussian model, which not only ensures the accuracy of subject recognition, but also avoids a high computation load.

At block 306, the moving subject in the current image frame is detected based on the initial binary image.

In detail, the ISP processor of the electronic device performs morphological processing on the initial binary image. The morphological processing includes eroding, dilating or the like. Mathematically, the dilation or erosion operation is to convolve the image (or part of the image, referred to as A) and a core (referred to as B). The core may be of any shape and size, having a separately defined reference point, referred to as anchor point. For example, the core may be a small solid square with a reference point in the middle, or the core may be a small solid disc with a reference point in the middle.

Dilation refers to convolving B and A, that is, calculating a maximum pixel value in an area covered by B, and assigning this maximum pixel value to the pixel specified by the reference point. The dilation gradually enlarges a bright area in the image.

Erosion refers to convolving B and A, that is, calculating a minimum pixel value in the area covered by B, and assigning this minimum pixel value to the pixel specified by the reference point. Erosion gradually enlarges a dark area in the image.

Further, the ISP processor of the electronic device first performs erosion processing and then performs dilation processing on the current image frame with the detected background area, which can remove noise in the initial binary image and reduce holes in the initial binary image. Connected domain processing is performed on the initial binary image after the morphological processing to determine the moving subject in the current image frame.

In this embodiment, by detecting the state of the current image frame which includes a non-shaking state and a shaking state, performing the background deduction processing on the current image frame to obtain the initial binary image when the current image frame is in the non-shaking state, detecting the moving subject in the current image frame based on the initial binary image, such that the target subject in the current image frame can be more accurately identified through the initial binary image, thus improving the accuracy of subject recognition.

Figure 4:
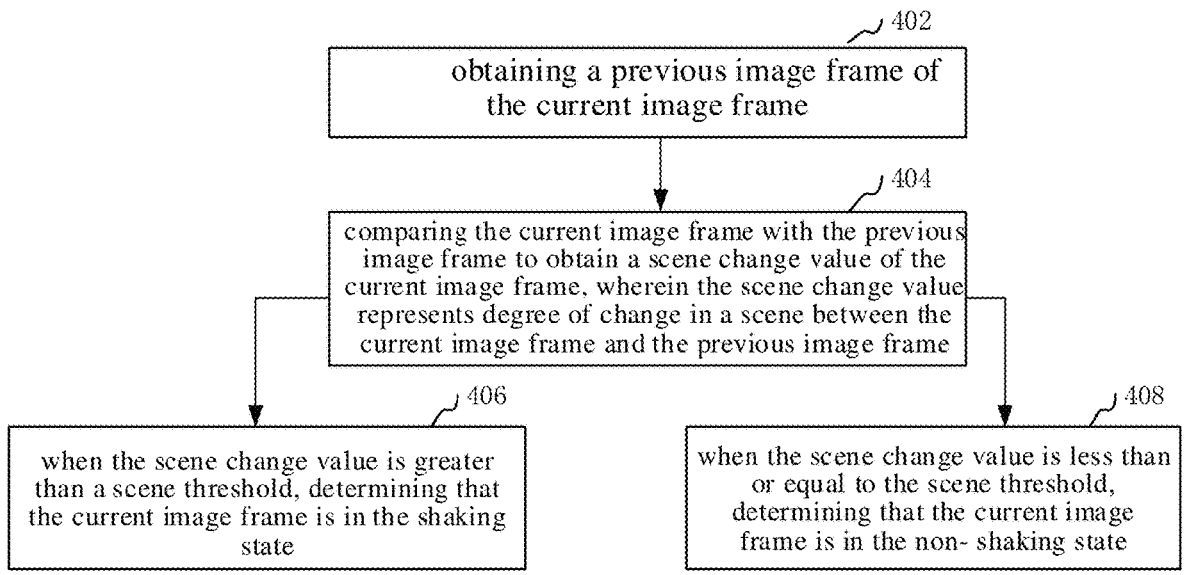
FIG. 4 is a flowchart of a process of detecting a state of the current image frame according to an embodiment of the present disclosure.

In an embodiment, as illustrated in FIG. 4, detecting the state of the current image frame includes the followings.

At block 402, a previous image frame of the current image frame is obtained.

At block 404, the current image frame is compared with the previous image frame to obtain a scene change value of the current image frame. The scene change value represents a degree of change in a scene between the current image frame and the previous image frame.

The scene change value may be obtained through an automatic focus (AF) module.

In detail, the AF module obtains a pixel value of each pixel included in the current image frame and a pixel value of each pixel included in the previous image frame. The pixels in the current image frame have a one-to-one correspondence with the pixels in the previous image frame. Differential processing is performed on the pixel value of each pixel in the current image frame and the pixel value of a corresponding pixel in the previous image frame to obtain difference values. The difference values are summed to obtain the scene change value.

The pixel value of a pixel may be a gray value, which is used to represent a brightness of the pixel. The higher the gray value, the brighter the pixel, while the lower the gray value, the darker the pixel. For example, if the gray value of a pixel is 255, which represents white, it indicates that the pixel has the highest brightness, and if the gray value of the pixel is 0, which represents black, it indicates that the pixel has the lowest brightness. The sum of the brightness changes of the pixels between the current image frame and the previous image frame is determined to represent the degree of change in the scene between the current image frame and the previous image frame. The larger the sum, the greater the degree of change in the scene between the current image frame and the previous image frame, and the smaller the sum, the smaller the degree of change in the scene between the current image frame and the previous image frame.

The number of pixels included in the current image frame is the same as the number of pixels included in the previous image frame, and there is a one-to-one correspondence between the pixels in the current image frame and the pixels in the previous image frame. For example, the pixel at row 5 and column 6 of the current image frame corresponds to the pixel at row 5 and column 6 of the previous image frame, and the pixel at row 100 and column 50 of the current image frame corresponds to the pixel at row 100 and column 50 of the previous image frame.

The ISP processor of the electronic device performs the differential processing on the pixel value of each pixel in the current image frame and the pixel value of a corresponding pixel in the previous image frame to obtain the difference values. For example, if the pixel value of the pixel at row 5 and column 6 of the current image frame is 150, and the pixel value of the corresponding pixel at row 5 and column 6 of the previous image frame is 120, then the difference value is 150−120=30. If the pixel value of the pixel at row 100 and column 50 of the current image frame is 50, and the pixel value of the corresponding pixel at row 100 and column 50 of the previous image frame is 75, then the difference value is 50−75=−25, and an absolute value of the difference value may be taken for sum processing.

At block 406, when the scene change value is greater than a scene threshold, it is determined that the current image frame is in the shaking state.

At block 408, when the scene change value is less than or equal to the scene threshold, it is determined that the current image frame is in the non-shaking state.

The scene threshold is a critical value for the change in the scene.

In detail, the ISP processor of the electronic device obtains the scene threshold, and compares the obtained scene change value with the scene threshold. When the scene change value is greater than the scene threshold, it is determined that the current image frame is in the shaking state. When the scene change value is less than or equal to the scene threshold, it is determined that the current image frame is in the non-shaking state With the above subject recognition method, the previous image frame of the current image frame is obtained, the current image frame is compared with the previous image frame, and the scene change value corresponding to the current image frame is obtained. When the scene change value is greater than the threshold value, it means that the degree of change in the scene between the current image frame and the previous image frame is large, such that the current image frame is determined to be in the shaking state. In this way, the accuracy of determining whether the current image frame is in the shaking state can be improved.

Figure 5:
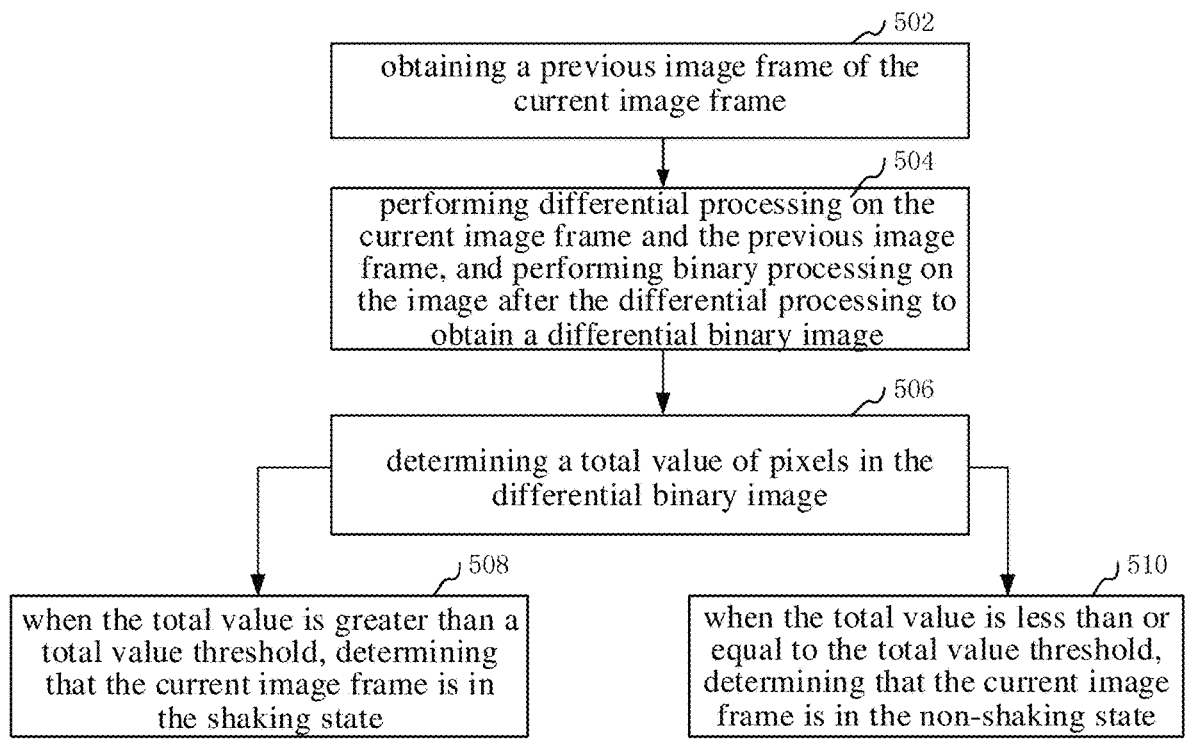
FIG. 5 is a flowchart of a process of detecting the state of the current image frame according to another embodiment of the present disclosure.

In an embodiment, as illustrated in FIG. 5, detecting a state of the current image frame includes the followings.

At block 502, a previous image frame of the current image frame is obtained.

At block 504, differential processing is performed on the current image frame and the previous image frame to obtain a differential processed image, and binary processing is performed on the differential processed image to obtain a differential binary image.

At block 506, a total value of pixels in the differential binary image is determined.

The differential processing refers to subtracting the pixel value of each pixel in the current image frame from the pixel value of a corresponding pixel in the previous image frame.

In detail, the ISP processor of the electronic device acquires the previous image frame of the current image frame. The pixel value of each pixel included in the current image frame and the pixel value of each pixel included in the previous image frame may be obtained. The pixels in the current image frame have a one-to-one correspondence with the pixels in the previous image frame. The differential processing is performed on the pixel value of each pixel in the current image frame and the pixel value of a corresponding pixel in the previous image frame to obtain the difference values. For each difference value, when the difference value is less than a difference threshold, a first value is generated; and when the difference value is greater than or equal to the difference threshold, a second value is generated. The second value is greater than the first value. A total value of the first values and the second values is obtained.

At block 508, when the total value is greater than a total value threshold, it is determined that the current image frame is in the shaking state.

At block 510, when the total value is less than or equal to the total value threshold, it is determined that the current image frame is in the non-shaking state.

The difference value refers to a difference obtained by performing the differential processing on the pixel value of a pixel in the current image frame and the pixel value of a corresponding pixel in the previous image frame. The total value refers to a sum of pixel values of the pixels in the differential binary image.

In detail, for a pixel at a certain position, when the difference value is less than the difference threshold, it can be considered that the pixel at the position in the previous image frame is the same as the corresponding pixel at the position in the current image frame, that is, the pixel does not shake in the previous image frame and the current image frame, and the pixel value of the pixel at the position is set to be the first value. When the difference value is greater than or equal to the difference threshold, it can be considered that the pixel at the position in the current image frame is different from the corresponding pixel at the position in the previous image frame, that is, the pixel at the position shakes from the previous image frame to the current image frame, and the pixel value of the pixel at the position is set to be the second value.

For example, if the pixel value of the pixel at row 10 and column 48 of the current image frame is 40, the pixel value of the pixel at row 10 and column 48 of the previous image frame is 45, and the difference threshold is 20, then the difference value for the pixel at row 10 and column 48 is 5, which is less than the difference threshold. It can be considered that the pixel at row 10 and column 48 of the previous image frame and the pixel at row 10 and column 48 of the current image frame are the same, that is, the pixel at row 10 and column 48 does not shake from the previous image frame to the current image frame, and the pixel value of the pixel at row 10 and column 48 in the differential binary image is set to be the first value.

For another example, if the pixel value of the pixel at row 55 and column 80 of the current image frame is 100, the pixel value of the pixel at row 55 and column 80 of the previous image frame is 220, and the difference threshold is 20, then the difference value for the pixel at row 55 and column 80 is 120, which is greater than the difference threshold. It can be considered that the pixel at row 55 and column 80 of the previous image frame is different from the pixel at row 55 and column 80 of the current image frame, that is, the pixel at row 55 and column 80 shakes from the previous image frame to the current image frame, and the pixel value of the pixel at row 55 and column 80 in the differential binary image is set to be the second value.

In an embodiment, the first value may be 0 and the second value may be 1. In another embodiment, the first value may be 0 and the second value may be 255. In other embodiments, the first value and the second value may also be set to other values, which are not limited herein.

Each pixel in the differential binary image is represented by the first value or the second value. The total value of the first values and the second values is a total value of the pixels in the differential binary image. When the total value of the pixels in the differential binary image is greater than the total value threshold, it indicates that there is a large difference between the pixels in the current image frame and the previous image frame, and it can be considered that the current image frame is in the shaking state.

In the above subject recognition method, the differential processing is performed on the current image frame and the previous image frame, and the binary processing is performed on the image after differential processing to obtain the differential binary image. The total value of the pixels in the differential binary image is counted. When the total value is greater than the total value threshold, it means that there is a large difference between the pixels in the current image frame and the previous image frame, and the current image frame is considered to be in the shaking state, and when the total value is less than or equal to the total value threshold, it means that there is a small difference between the pixels in the current image frame and the previous image frame, and it is determined that the current image frame is in the non-shaking state. In this way, the accuracy of determining whether the current image frame is in the shaking state can be improved.

In an embodiment, the current image frame and the previous image frame may be filtered to obtain images with a higher accuracy. The filtering processing may be at least one of Gaussian filtering, smoothing filtering, and bilateral filtering.

In an embodiment, morphological processing is performed on the differential binary image to obtain a more accurate differential binary image. The morphological processing includes eroding, dilating or the like. By performing the morphological processing on the differential binary image, the noise in the differential binary image may be removed, and holes in the differential binary image are reduced.

Figure 6:
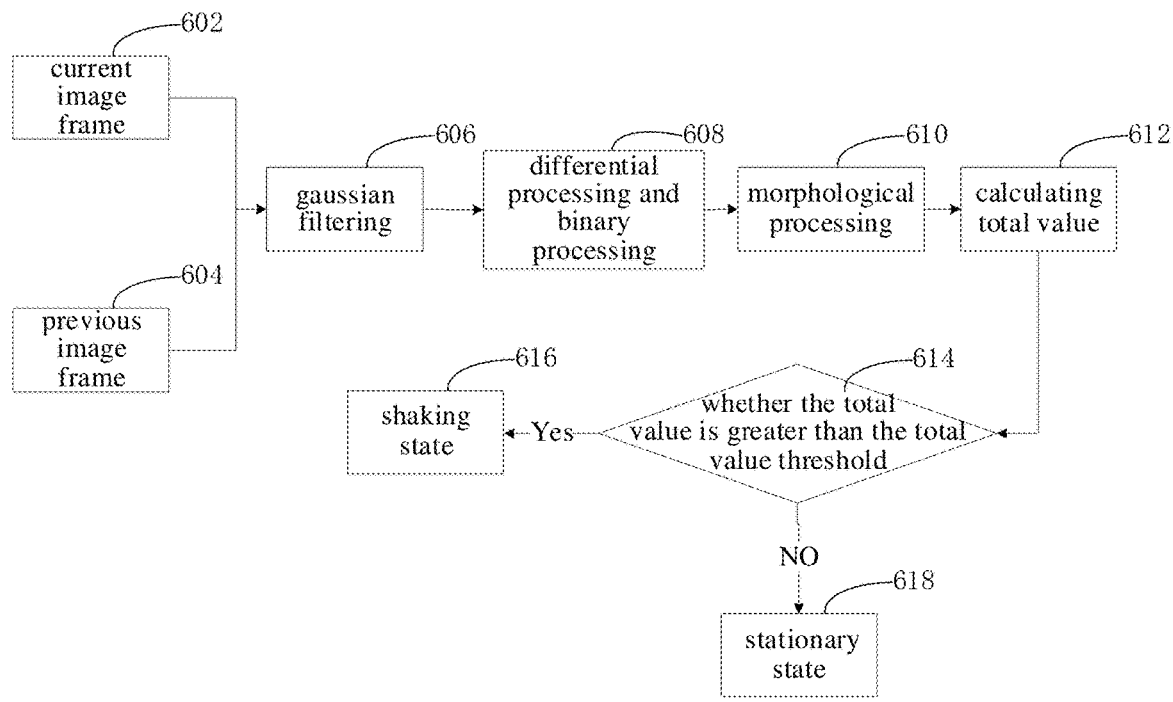
FIG. 6 is a schematic diagram of a process of determining whether the current image frame is in a shaking state according to an embodiment of the present disclosure.

In an embodiment, as illustrated in FIG. 6, a current image frame 602 and a previous image frame 604 are acquired, and an act at block 606, that is, Gaussian filtering is performed on the current image frame 602 and the previous image frame 604 to obtain a more accurate current image frame and a more accurate previous image frame. An act at block 608, that is, differential processing is performed on the current image frame and the previous image frame after the Gaussian filtering, and binary processing is performed on an image after the differential processing to obtain a differential binary image. An act at block 610, that is, morphological processing is performed on the differential binary image to obtain a more accurate differential binary image. An act at block 612 is executed to calculate a total value of pixels in the differential binary image after the morphological processing. An act at block 614 is executed to determine whether the total value is greater than a total value threshold. At block 616, when the total value is greater than the total value threshold, the current image frame is determined to be in the shaking state. At block 618, when the total value is less than or equal to the total value threshold, the current image frame is determined to be in the non-shaking state.

In an embodiment, detecting the state of the current image frame includes: determining a pixel value of each pixel in the current image frame; determining a first pixel value vector of the current image frame based on the pixel value of each pixel in the current image frame, the first pixel value vector representing a distribution of the pixel value of each pixel in the current image frame; obtaining a previous image frame of the current image frame, and determining a pixel value of each pixel in the previous image frame; determining a second pixel value vector of the previous image frame based on the pixel value of each pixel in the previous image frame, the second pixel value vector representing a distribution of the pixel value of each pixel in the previous image frame; determining a vector distance between the current image frame and the previous image frame based on the first pixel value vector and the second pixel value vector; when the vector distance is greater than a distance threshold, determining that the current image frame is in the shaking state; and when the vector distance is less than or equal to the distance threshold, determining that the current image frame is in the non-shaking state.

In detail, the pixel value of each pixel included in the current image frame is obtained, the number of pixels with a certain pixel value is counted, and a pixel value histogram of the current image frame is generated. For example, the number of pixels with a pixel value of 150 is 100, and the number of pixels with a pixel value of 255 is 50. In other embodiments, a pixel value bar chart, a pixel value pie chart may also be generated, which is not limited herein.

Similarly, the pixel value of each pixel included in the previous image frame is obtained, the number of pixels with a certain pixel value is counted, and a pixel value histogram of the previous image frame is generated. In other embodiments, a pixel value bar chart, a pixel value pie chart may also be generated, which is not limited herein.

According to the number of pixels with a certain pixel value in the current image frame, the first pixel value vector of the current image frame may be determined. The first pixel value vector may be a 256-dimensional vector, that is, corresponding to pixel values from 0 to 255. The first pixel value vector may be (10, 50, 65, . . . 30, 56, 84). Each value in the first pixel value vector indicates the number of pixels with a certain pixel value, for example, 10 indicates that the number of pixels with a pixel value of 0 is 10, and 50 indicates that the number of pixels with a pixel value of 1 is 50, 56 indicates that the number of pixels with a pixel value of 254 is 56, and 84 indicates that the number of pixels with a pixel value of 255 is 84.

Similarly, according to the number of pixels with a certain pixel value in the previous image frame, the second pixel value vector of the previous image frame is generated. The second pixel value vector may also be a 256-dimensional vector, that is, corresponding to pixel values from 0 to 255.

After acquiring the first pixel value vector and the second pixel value vector, the first pixel value vector and the second pixel value vector may be operated to determine the vector distance between the current image frame and the previous image frame. The first pixel value vector is used to represent the distribution of the pixel values of the pixels in the current image frame, and the pixel value is used to represent the color of the pixel, such that the first pixel value vector is used to represent a color distribution of the current image frame. Similarly, the second pixel value vector is used to represent a color distribution of the previous image frame. Therefore, the vector distance is used to indicate a degree of color difference between the current image frame and the previous image frame.

When the vector distance is greater than the distance threshold, it indicates that the color difference between the current image frame and the previous image frame is large, and it can be considered that the current image frame is in the shaking state.

With the above subject recognition method, the first pixel value vector of the current image frame is generated based on the pixel value of each pixel in the current image frame, and the second pixel value vector of the previous image frame is generated based on the pixel value of each pixel in the previous image frame. The degree of color difference between the current image frame and the previous image frame is determined based on the first pixel value vector and the second pixel value vector, that is, the vector distance between the current image frame and the previous image frame is obtained. When the vector distance is greater than the distance threshold, it means that the color difference between the current image frame and the previous image frame is large, and it may be considered that the current image frame is in the shaking state. In this way, the accuracy of determining whether the current image frame is in the shaking state may be improved.

In an embodiment, before detecting the moving subject in the current image frame based on the initial binary image, the method further includes: when the current image frame is in the shaking state, obtaining the previous image frame of the current image frame, and performing correction processing on the previous image frame based on the current image frame; and performing background deduction processing on the current image frame based on the corrected previous image frame to obtain the initial binary image.

In detail, when the current image frame is in the shaking state, the current image frame is blurry, and when the current frame is in the non-shaking state, that is, when the current image frame is in a stationary state, the current image frame is clear. When the ISP processor of the electronic device detects that the current image frame is in the shaking state, a transformation matrix between the current image frame and the previous image frame is obtained and the previous image frame is corrected based on the transformation matrix.

In an embodiment, when the camera of the electronic device is in a motion state, the current image frame captured by the camera is blurry, that is, the current image frame is in the shaking state. In another embodiment, when the object captured by the camera is in a motion state, the current image frame captured by the camera is also blurred, that is, the current image frame is in the shaking state.

The transformation matrix is used to represent a matrix for converting pixels in the previous image frame to pixels in the current image frame. For example, if a position of a feature point in the previous image frame is (200,50), and a position of a corresponding feature point in the current image frame is (200,100), then the transformation matrix may indicating that the feature point in the previous image frame at the position (200,50) is converted to the feature point in the current image frame at the position (200,100).

In detail, a first position coordinate of each pixel in the previous image frame is obtained. The first position coordinate of each pixel in the previous image frame is multiplied by the transformation matrix to obtain a second position coordinate of each pixel correspondingly. The corrected previous image frame may be generated based on the second position coordinate of each pixel.

The first position coordinate refers to a position coordinate of each pixel in the previous image frame before the correction processing. The second position coordinate refers to a position coordinate of each pixel in the previous image frame after the correction processing. Position coordinate such as (200,50) indicates a position where the abscissa is 200 and the ordinate is 50.

In an embodiment, there may be some noisy points in the corrected previous image frame. The corrected previous image frame may be filtered to remove noisy points and obtain a more accurate previous image frame. The filtering processing may be at least one of Gaussian filtering, smoothing filtering, and bilateral filtering.

The ISP processor of the electronic device updates the background detection model according to the corrected previous image frame. The background detection model includes a first background detection model and a second background detection model. Further, the first background detection model is updated according to the corrected previous image frame. The first background detection model refers to a model for detecting background of an image. The first background detection model may be a single Gaussian model. The first background detection model may include one or more parameters, such as a mean and a variance of pixel values of pixels in the background area, and a mean and a variance of pixel values of pixels in the subject area, which are not limited herein.

The corrected previous image frame is closer to the current image frame, and the parameters in the first background detection model are updated according to the corrected previous image frame. By performing background detection on the current image frame through the updated first background detection model, an initial binary image including a first background area and the subject area is obtained. The first background area refers to a background area obtained by performing the background detection on the current image frame through the first background detection model.

Similarly, the second background detection model is also a model for detecting background of an image. The second background detection model may also be a single Gaussian model. The parameters of the first background detection model and the parameters of the second background detection model are different. The parameters are, for example, the mean and the variance of pixel values of pixels in the background area, and the mean and the variance of pixel values of pixels in the subject area. When one of the background detection models is selected to perform the background detection on the current image frame at a moment, then the selected background detection model is used as the first background detection model, and the other background detection model is used as the second background detection model.

The method further includes: when the first background area detected by the first background detection model is different from a reference background area, updating the second background detection model based on the corrected previous image frame; and performing the background detection on the current image frame based on the updated second background detection model to obtain an initial binary image including a second background area and the subject area.

The reference background area refers to a background area used for comparison with the detected background area. The reference background area is obtained by processing the current image frame through a Gaussian function, or by acquiring a preset area of the current image frame, which is not limited herein. The second background area refers to a background area obtained by performing the background detection on the current image frame through the second background detection model.

In an embodiment, determining whether the first background area is different from the reference background area includes: comparing the first background area with the reference background area to obtain a difference degree, the difference degree indicating a degree of difference between the first background area and the reference background area; when the difference degree is greater than a difference degree threshold, determining that the first background area is different from the reference background area; and when the difference degree is less than or equal to the difference degree threshold, determining that the first background area is the same as the reference background area.

In detail, a pixel value of each pixel in the first background area is obtained, and a pixel value of a corresponding pixel in the reference background area is obtained. The pixel value of each pixel contained in the first background area is subtracted from the pixel value of the corresponding pixel in the reference background area to obtain difference values. All absolute values of the difference values are added to obtain a sum, which may indicate the degree of difference (i.e., the difference degree) between the first background area and the reference background area.

When the difference degree is greater than the difference degree threshold, it means that the first background area is significantly different from the reference background area, and the first background area is considered to be different from the reference background area. When the difference degree is less than or equal to the difference degree threshold, it means that the first background area is slightly different from the reference background area, and it is considered that the first background area is the same as the reference background area.

When the first background area detected by the first background detection model is different from the reference background area, it means that the first background area detected by the first background detection model is inaccurate, and then the second background detection model is updated. The updated second background detection model is used to perform the background detection on the current image frame to obtain the initial binary image of the current image frame.

The traditional background detection method usually uses a GMM Gaussian mixture model for detection, which requires a large amount of calculation. In this embodiment, each of the first background detection model and the second background detection model is a single Gaussian model, and only one of the models is used to perform the background detection on the current image frame at any time. The calculation amount of the single Gaussian model is smaller than that of the GMM Gaussian mixture model. When the first background area detected by the first background detection model is different from the reference background area, it means that the first background area detected by the first background detection model is inaccurate and then the background detection is performed on the current image frame through the updated second background detection model. In this way, not only the accuracy of the detected background area is improved, which improves the accuracy of subject detection, but also the high calculation amount is avoided.

In an embodiment, the above method further includes: obtaining an update coefficient of the first background detection model and an update coefficient of the second background detection model, the update coefficient indicating an update degree of the background detection model; and comparing the update coefficient of the first background detection model and the update coefficient of the second background detection model, and selecting a background detection model with a larger update coefficient from the first background detection model and the second background detection model to perform the background detection on the current image frame.

The update coefficient refers to the update degree of the background detection model. The larger the update coefficient, the greater the update degree of the background detection model, and the more accurate the background area obtained by performing the background detection on the current image frame.

Therefore, the update coefficient of the first background detection model and the update coefficient of the second background detection model may be obtained in real time. The update coefficient of the first background detection model and the update coefficient of the second background detection model are compared, and the background detection model with a larger update coefficient is selected from the first background detection model and the second background detection model to perform the background detection on the current image frame.

In an embodiment, the first background detection model is used to perform the background detection on the current image frame, that is, the second background detection model is a candidate background detection model. When the update coefficient of the first background detection model is greater than or equal to the update coefficient of the second background detection model, the background detection of the current image frame is still performed through the first background detection model, and the second background detection model is still the candidate background detection model. When the update coefficient of the first background detection model is less than the update coefficient of the second background detection model, the background detection is performed on the current image frame through the second background detection model, that is, the first background detection model is the candidate background detection model.

In another embodiment, the second background detection model is used to perform the background detection on the current image frame, that is, the first background detection model is the candidate background detection model. When the update coefficient of the second background detection model is greater than or equal to the update coefficient of the first background detection model, the background detection is still performed on the current image frame through the second background detection model, and the first background detection model is still the candidate background detection model. When the update coefficient of the second background detection model is less than the update coefficient of the first background detection model, then the background detection is performed on the current image frame through the first background detection model, that is, the second background detection model is the candidate background detection model.

With the above subject recognition method, the update coefficient of the first background detection model and the update coefficient of the second background detection model are obtained, the update coefficient of the first background detection model is compared with the update coefficient of the second background detection model, and the background detection model with the larger update coefficient is selected from the first background detection model and the second background detection model to perform the background detection on the current image frame, such that the background area of the current image frame can be more accurately detected, thereby more accurately obtaining the initial binary image of the current image frame.

In another embodiment, the differential processing is performed on the current image frame and the previous image frame, to detect the background area of the current image frame, thereby reducing the calculation amount.

In another embodiment, other background detection models, such as a ViBe model, may also be used to perform the background detection on the current image frame to obtain a more accurate background area, thereby obtaining a more accurate initial binary image.

In an embodiment, performing the correction processing on the previous image frame based on the current image frame includes: obtaining a target point pair from the current image frame and the previous image frame; determining a transformation matrix between the current image frame and the previous image frame based on the target point pair; and performing the correction processing on the previous image frame based on the transformation matrix.

The target point pair refers to a pair of points composed of a point in the current image frame and a corresponding point in the previous image frame. The point included in the target point pair may be a pixel or an area containing several pixels which is used as a feature point, or a point randomly obtained from the current image frame or the previous image frame, which is not limited here. For example, the pixel at row 5 and column 29 of the current image frame and the pixel at row 5 and column 29 of the previous image frame form a target point pair, and a tip-defining point in the current image frame and a tip-defining point in the previous image frame form a target point pair.

There may be one or more target point pairs, which is not limited herein. It is understood that the greater the number of the target point pairs, the more accurate the transformation matrix obtained based on the target point pairs.

In detail, positions of the two points included in the target point pair are obtained, and the transformation matrix between the current image frame and the previous image frame is obtained based on the positions of the two points included in each target point pair.

Variables in the transformation matrix may be set in advance. When there are four variables in the transformation matrix, four equations are needed, that is, four target point pairs are needed. For each target point pair, the position of the point in previous image frame is multiplied by a preset transformation matrix to obtain the position of the point in the current image frame, thus forming four equations. The four preset variables in the transformation matrix are solved to obtain the transformation matrix. A first position coordinate of each pixel in the previous image frame is obtained, and the position coordinate of each pixel in the previous image frame is multiplied by the transformation matrix to obtain a second position coordinate of the corresponding pixel. The corrected previous image frame is generated based on the second position coordinate of each pixel.

The first position coordinate refers to a position coordinate of each pixel in the previous image frame before the correction processing. The second position coordinate refers to a position coordinate of each pixel in the previous image frame after the correction processing. Position coordinate such as (200,50) indicate a position where the abscissa is 200 and the ordinate is 50.

In the above subject recognition method, when it is detected that the current image frame is in the shaking state, the target point pair is obtained from the current image frame and the previous image frame. Based on the target point pair, a more accurate transformation matrix between the current image frame and the previous image frame can be obtained.

In an embodiment, the target point pair includes at least one of a tracking point pair and a matching point pair.

The target point pair may include only the tracking point pair or only the matching point pair, and may also include both the tracking point pair and the matching point pair.

Figure 7:
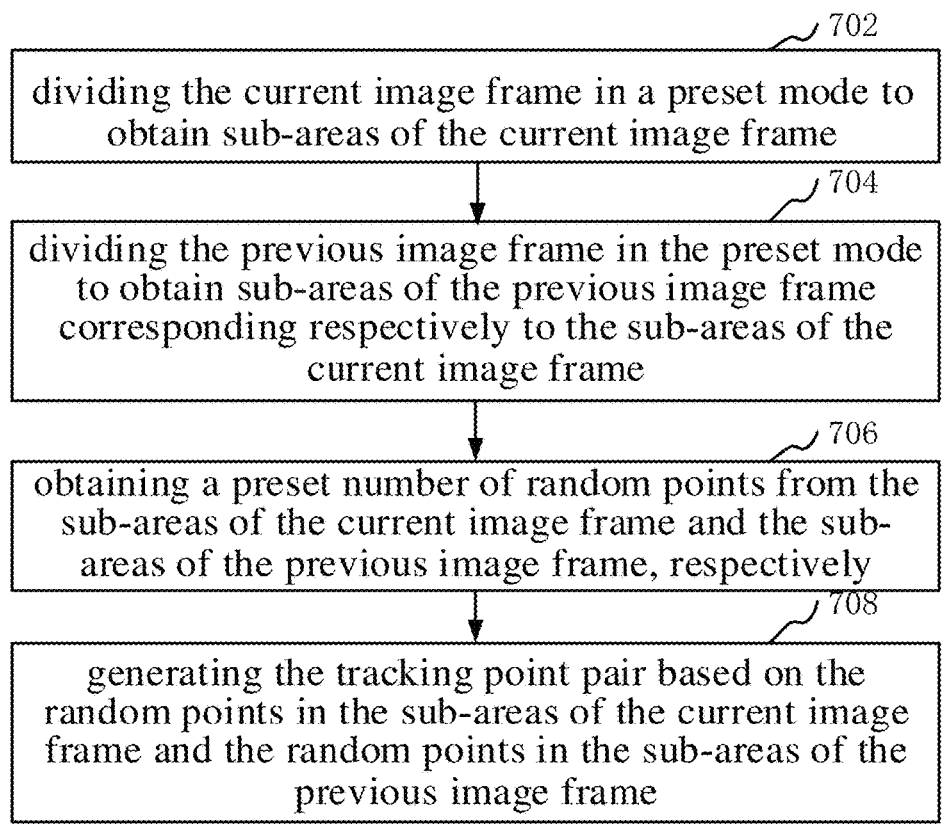
FIG. 7 is a flowchart of a process of generating a tracking point pair according to an embodiment of the present disclosure.

In an embodiment, as illustrated in FIG. 7, the target point pair includes at least one of the tracking point pair and the matching point pair, and the tracking point pair is generated as follows.

At block 702, the current image frame is divided in a preset mode to obtain sub-areas of the current image frame.

The preset mode refers to a preset dividing mode. The preset mode may be to divide the current image frame into a preset number of sub-areas.

In detail, the ISP processor of the electronic device may divide the current image frame into a preset number of sub-areas according to a preset processing manner, so as to obtain the preset number of sub-areas of the current image frame.

At block 704, the previous image frame is divided in the preset mode to obtain sub-areas of the previous image frame corresponding respectively to the sub-areas of the current image frame.

In detail, the previous image frame is divided in the same preset mode to obtain the preset number of sub-areas of the previous image frame. By using the same dividing method, the previous image frame and the current image frame are divided into the same number of sub-areas, and the sub-areas of the current image frame have a one-to-one correspondence with the sub-areas of the previous image frame. For example, if the current image frame is divided into nine squares, then the previous image frame is divided into nine squares similarly. It is understood that the larger the number of the sub-areas, the finer the image is divided, and the more accurate the acquired tracking point pair.

At block 706, a preset number of random points are obtained from the sub-areas of the current image frame and the sub-areas of the previous image frame, respectively.

In detail, the points may be randomly selected from the sub-areas. One or more random points may be extracted from each sub-area.

For example, 10 random points are randomly extracted from the first sub-area of the current frame image, and 10 random points are randomly extracted from the first sub-area of the previous frame image. Moreover, if 5 random points are randomly extracted from the third sub-area of the current image frame, then 5 random points are randomly extracted from the third sub-area of the previous image frame.

At block 708, the tracking point pair is generated based on the random points in the sub-areas of the current image frame and the random points in the sub-areas of the previous image frame.

When a random point is extracted from a sub-area of the current image frame, and a random point is also extracted from a corresponding sub-area of the previous image frame, then the two random points extracted may form a tracking point pair. When N random points are extracted from a sub-area of the current image frame, at least two random points are also extracted from a corresponding sub-area of the previous image frame, then the first random point randomly extracted from the sub-area of the current image frame and the first random point randomly extracted from the corresponding sub-area of the previous image frame constitutes a tracking point pair. The n-th random point randomly extracted from the sub-area of the current image frame and the n-th random point randomly extracted from the corresponding sub-area of the previous image frame together form a tracking point pair.

With the above subject recognition method, the tracking point pairs are generated by extracting the random points, which improves randomness of the target point pair and avoids the problem of low accuracy of the subsequently obtained transformation matrix due to shortage of the target point pairs in a weakly textured area. In this way, the extracted target point pairs have a better global distribution, such that the accuracy of the transformation matrix may be improved, thereby improving the accuracy of subject recognition.

In an embodiment, the matching point pair is generated by extracting feature points from the current image frame and the previous image frame respectively, and generating the matching point pair based on the feature points from the current image frame and the previous image frame.

The feature point refers to a point where the gray value of the image changes drastically or a point on an edge of the image with a large curvature (that is, an intersection of two edges). The feature point may include, but is not limited to, eyes, tip of nose, corner of mouth, mole, and center of an object.

In detail, the gray value of each pixel in the current image frame is detected, and when a difference between the gray values of adjacent pixels is greater than a threshold, an area where the adjacent pixels are located is used as a feature point. The feature point extracted from the current image frame and the corresponding feature point from the previous image frame form a matching point pair. Generally, the larger the number of matching point pairs, the more accurate the transformation matrix subsequently obtained based on the matching point pairs.

In an embodiment, the corresponding feature point may be extracted from the previous image frame based on the feature point from the current image frame. In another embodiment, the gray value of each pixel in the previous image frame is detected. When a difference between the gray values of adjacent pixels is greater than the threshold, an area where the adjacent pixels are located is used as a feature point, and a correspondence is established between the feature point from the previous image frame and the feature point from the current image frame.

In an embodiment, a target area is obtained, the feature point is extracted from the target area of the current image frame and the corresponding feature point is extracted from the target area of the previous image frame.

It is understood that the target area may be a central area of an image. Generally, the subject in the image or the object captured by the user is located in the central area of the image. Extracting the feature points from the center area of the current image frame and the center area of the previous image frame can not only save the calculation amount of the electronic device, but also improve the accuracy of the extracted feature points.

With the above subject recognition method, the feature points is extracted from the current image frame and the corresponding feature point is extracted from the previous image frame, the matching point pair is generated based on the feature points extracted from the current image frame and the previous image frame. The extracted feature points can more accurately express features of the current image frame and the previous image frame, such that the accuracy of the transformation matrix can be improved, thereby improving the accuracy of subject recognition.

In an embodiment, generating the tracking point pair based on the random points in the sub-areas of the current image frame and the random points in the sub-areas of the previous image frame includes: performing optical flow tracking on the current image frame and the previous image frame to obtain a motion vector of the current image frame and the previous image frame; and mapping the random points in the previous image frame to the current image frame by the motion vector to generate the tracking point pair.

The tracking point pair refers to the target point pair obtained by optical flow tracking.

In a video sequence, a movement of an object between frames may be expressed as a moving speed of the object, which is the optical flow. The motion vector refers to a relative displacement of the object between the current image frame and the previous image frame. The optical flow tracking is performed on the random points in each sub-area of the current image frame and the random points in each sub-area of the previous image frame, and the motion vector of the current image frame and the previous image frame may be obtained by solving a motion equation of the object. The object may be a pixel or an area composed of a plurality of pixels, which is not limited here.

The motion vector may obtain the relative displacement of the object between the current image frame and the previous image frame, and the random point in the previous image frame may be mapped to the current image frame through the motion vector to find the corresponding random point in the current image frame. The random point in the previous image frame and the corresponding random point in the current image frame may form a tracking point pair.

With the above subject recognition method, the optical flow tracking is performed on the current image frame and the previous image frame to obtain the motion vector of the current image frame and the previous image frame. The random point of the previous image frame is mapped into the current image frame through the motion vector, thus a more accurate tracking point pair may be generated.

In an embodiment, the subject recognition method further includes: performing vector filtering on the random points in the current image frame and the random points in the previous image frame to obtain a target random point in the current image frame and a target random point in the previous image frame. Mapping the random points in the previous image frame to the current image frame by the motion vector to generate the tracking point pair includes: mapping the target random point in the previous image frame to the current image frame by the motion vector to generate the tracking point pair.

In detail, the vector filtering may include modulus filtering and angle filtering. The vector filtering can remove some erroneous random points. Further, when the random points in one image are removed, the corresponding random points in the other image are removed.

In this embodiment, the target random point may be a random point in a background area in an image. The random points in the subject area in the current image frame are removed by the vector filtering to obtain the random points in the background area, thus the target random points in the current image frame are obtained. Similarly, the random points in the background area in the previous image frame, that is, the target random points in the previous image frame are obtained.

With the above subject recognition method, the vector filtering is performed on the random points of the current image frame and the random points of the previous image frame to remove some erroneous random points, thereby obtaining a more accurate tracking point pair.

In another embodiment, the optical flow tracking is performed on the current image frame and the previous image frame to obtain the tracking point pairs, and the vector filtering is performed on the tracking point pairs to remove erroneous tracking point pairs, thereby obtaining the more accurate tracking point pair.

Figure 8:
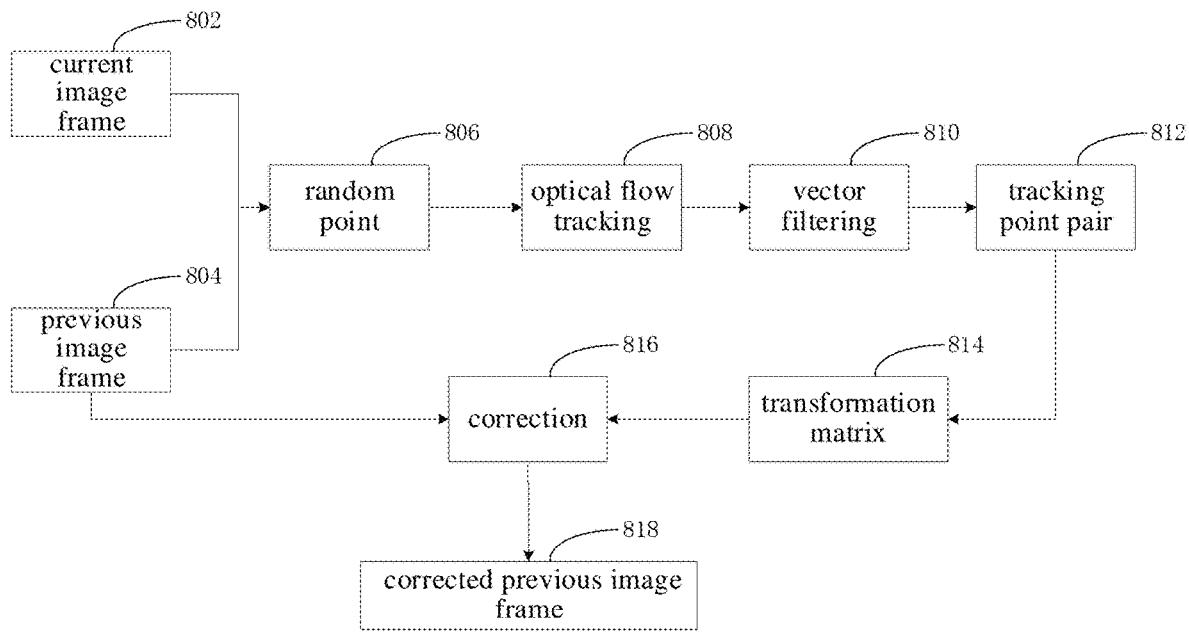
FIG. 8 is a schematic diagram of a process of correcting a previous image frame based on the tracking point pair according to an embodiment of the present disclosure.

In an embodiment, as illustrated in FIG. 8, a current image frame 802 and a previous image frame 804 are divided likewise to obtain sub-areas of the current image frame and sub-areas of the previous image frame. A target number of random points 806 are extracted from the sub-areas of the current image frame and the sub-areas of the previous image frame, respectively. At block 808, optical flow tracking is performed on the random points in each sub-area of the current image frame and the random points in each sub-area of the previous image frame to obtain a motion vector of the current image frame and the previous image frame. The random points in the previous image frame are mapped to the current image frame by the motion vector to generate first tracking point pairs. At block 810, vector filtering is performed on the random points included in the first tracking point pairs to remove erroneous random points, thereby obtaining target random points in the current image frame and target random points in the previous image frame. The target random points in the current image frame and the target random points in the previous image frame are combined to obtain second tracking point pairs, that is, tracking point pairs 812. A transformation matrix 814 between the current image frame and the previous image frame is obtained based on the tracking point pairs 812. At block 816, the previous image frame 804 is corrected according to the transformation matrix 814 to obtain the corrected previous image frame 818.

In an embodiment, generating the matching point pair further includes: generating feature descriptors corresponding respectively to the feature points from the current image frame; generating feature descriptors corresponding respectively to the feature points from the previous image frame; and matching the feature descriptors corresponding to the current image frame with the feature descriptors corresponding to the previous image frame to obtain the matching point pair.

The feature descriptor is used to represent a feature of the feature point. For example, the feature descriptor may represent a pixel value of the feature point, a direction of the feature point, domain information of the feature point, which is not limited herein. By acquiring the pixel value of the feature point, the direction of the feature point, the domain information and other data of the feature point, the feature descriptor of the feature point is generated.

The feature descriptor can be ORB feature descriptor=Fast feature point (corner point) extraction+ BRIEF feature description, or a scale-invariant feature transform (SIFT) feature descriptor, or other feature descriptors, which is not limited herein.

In detail, the feature descriptor corresponding to the current image frame is matched with the feature descriptor corresponding to the previous image frame, for example, in terms of at least one of the pixel value of the feature point, the direction of the feature point, and the domain information of the feature point. The more the matched features, the more accurate the matching point pair.

With the above subject recognition method, the feature descriptor of each feature point in the current image frame is matched with the feature descriptor of each feature point in the previous image frame to generate a more accurate matching point pair.

In an embodiment, a random sample consensus (RANSAC) algorithm may be used to process the matching point pairs, so as to remove some matching point pairs that are erroneously matched and obtain the more accurate matching point pairs.

Figure 9:
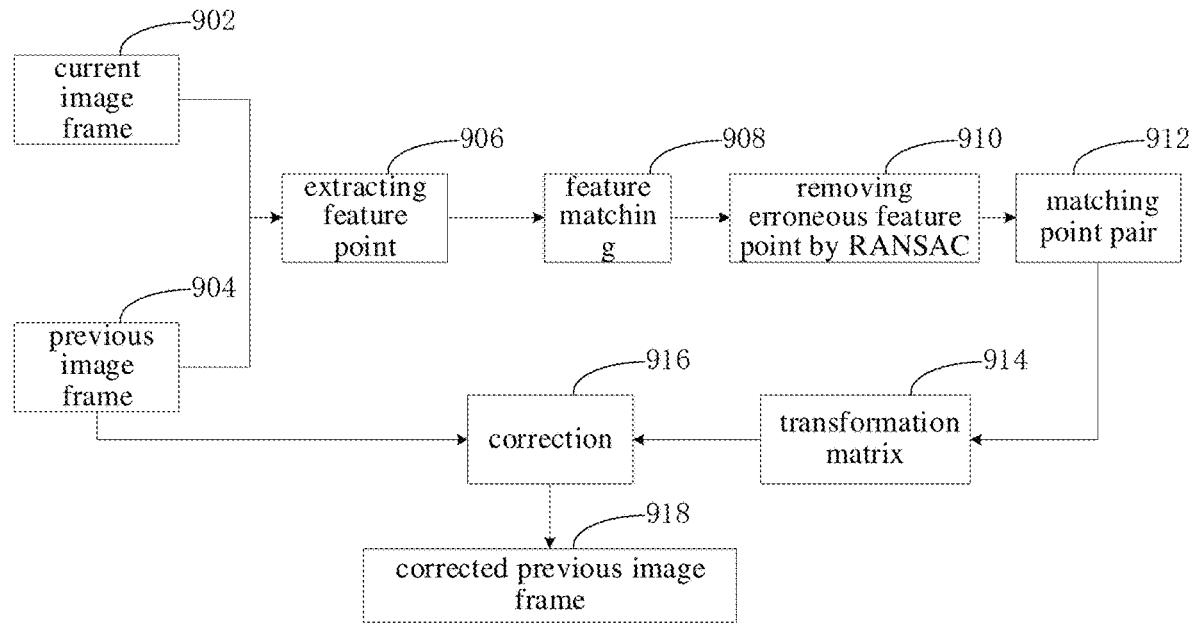
FIG. 9 is a schematic diagram of a process of correcting the previous image frame based on a matching point pair according to an embodiment of the present disclosure.

In an embodiment, as illustrated in FIG. 9, feature points are extracted from a current image frame 902 and corresponding feature points are extracted from a previous image frame 904. At block 906, a corresponding feature descriptor is generated according to the feature point from the current image frame 902, and a corresponding feature descriptor is generated according to the feature point extracted from the previous image frame 904. At block 908, feature matching is performed on the feature descriptors corresponding to the current image frame and the feature descriptors corresponding to the previous image frame to obtain first matching point pairs. In an embodiment, at block 910, the first matching point pairs are processed by using the RANSAC algorithm, thereby removing some first matching point pairs that are erroneously matched and obtaining more accurate second matching point pairs, namely matching point pairs 912. A transformation matrix 914 between the current image frame and the previous image frame is obtained based on the matching point pairs 912. At block 916, the previous image frame 904 is corrected according to the transformation matrix 914 to obtain the corrected previous image frame 918.

Figure 10:
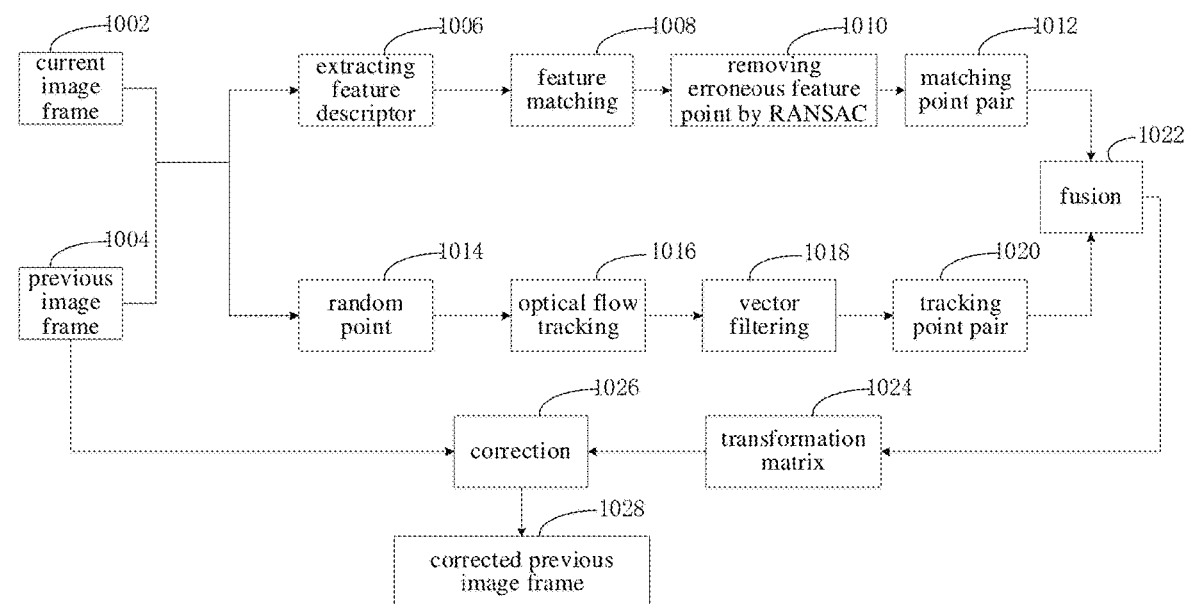
FIG. 10 is a schematic diagram of a process of correcting the previous image frame according to the tracking point pair and the matching point pair according to an embodiment of the present disclosure.

In an embodiment, the target point pair includes the tracking point pair and the matching point pair, as illustrated in FIG. 10. Feature points are extracted from a current image frame 1002, and corresponding feature points are extracted from a previous image frame 1004. At block 1006, a corresponding feature descriptor is generated according to each feature point from the current image frame 1002, and a corresponding feature descriptor is generated according to each feature point extracted from the previous image frame 1004. At block 1008, feature matching is performed on the feature descriptors corresponding to the current image frame and the feature descriptors corresponding to the previous image frame to obtain first matching point pairs. In an embodiment, at block 1010, the first matching point pairs are processed by using the RANSAC algorithm, thereby removing some first matching point pairs that are erroneously matched and obtaining more accurate second matching point pairs, namely matching point pairs 1012.

The current image frame 1002 and the previous image frame 1004 are divided in the same manner to obtain sub-areas of the current image frame and sub-areas of the previous image frame. A target number of random points 1014 are extracted from the sub-areas of the current image frame and the sub-areas of the previous image frame, respectively. At block 1016, optical flow tracking is performed on the random points in each sub-area of the current image frame and the random points in each sub-area of the previous image frame to obtain the motion vector of the current image frame and the previous image frame. The random points in the previous image frame are mapped to the current image frame by the motion vector to generate first tracking point pairs. At block 1018, vector filtering is performed on the random points included in the first tracking point pairs to remove erroneous random points, thereby obtaining target random points in the current image frame and target random points in the previous image frame. The target random points in the current image frame and the target random points in the previous image frame are combined to obtain second tracking point pairs, namely tracking point pairs 1020.

At block 1022, the matching point pairs 1012 and the tracking point pairs 1020 are fused, that is, both the matching point pairs 1012 and the tracking point pairs 1020 are used as the target point pairs, and the transformation matrix 1024 between the current image frame and the previous image frame is obtained based on a target point pairs. At block 1026, and the previous image frame 1004 is corrected according to the transformation matrix 1024 to obtain the corrected previous image frame 1028.

In an embodiment, the above method further includes: acquiring position information of each target point included in each target point pair; performing a differential operation on the position information of any two target points in the same image frame to obtain a corresponding position difference value; obtaining a target point from the two target points between which the position difference value is less than a difference threshold as a removal target point; removing a target point pair corresponding to the removal target point.

Determining the transformation matrix between the current image frame and the previous image frame based on the target point pair, includes: based on the target point pairs excluding the target point pair corresponding to the removal target point, obtaining the transformation matrix between the current image frame and the previous image frame.

The removal target point refers to the target point to be removed.

The position information of the target point can be expressed in coordinates. For example, if the position information of a target point is (50,100), it indicates that the target point is located at row 50 and column 100 of an image, and if the position information of a target point is (80,12), it indicates that the target point is located at row 80 and column 12 of the image.

In the same image, the position information of any two target points is obtained, and differential operation is performed on the obtained position information of the two target points to obtain a corresponding position difference value.

For example, in the current image frame, the position information of any two target points is (50,100), (50,90), and the following formula may be used to calculate the corresponding position difference value:

$$S=\sqrt{(a_1-a_2)^2+(b_1-b_2)^2}.$$

S is the position difference value, $a_1$ and $b_1$ are the abscissa and ordinate of a target point, and $a_2$ and $b_2$ are the abscissa and ordinate of another target point, respectively. Therefore, the position difference value between the two target points is:

$$S=\sqrt{(50-50)^2+(100-90)^2}=10.$$

When the position difference value is less than the difference threshold, it means that the two target points are close in position, and then any one of the two target points between which the position difference value is less than the difference threshold is selected as the removal target point.

After acquiring the removal target point, the target point pair corresponding to the removal target point is removed. For example, the target point pair includes a target point A and a target point B. When the target point A is determined as the removal target point, the target point pair corresponding to the target point A is removed, that is, the target point A and the target point B are removed.

It is understood that the target points in the same area may have similar features. When there are a plurality of target points in the same area, some of the target points are removed to avoid a situation of processing the plurality of the target points in the same area, in which resources of electronic device may be wasted and the accuracy of the global matrix may be affected. After removing the target point pair corresponding to the removal target point, a global distribution of the target points is better, and the remaining target point pairs are processed. IN this way, the transformation matrix between the current image frame and the previous image frame may be obtained faster, and the efficiency of obtaining the transformation matrix is improved.

In an embodiment, detecting the moving subject in the current image frame based on the initial binary image includes: performing connected domain processing on the initial binary image to determine an area of each candidate subject in the initial binary image; when there is a candidate subject having the area greater than or equal to an area threshold, determining that there is a moving subject in the current image frame; and when the area of each candidate subject is smaller than the area threshold, determining that there is no moving subject in the current image frame.

The connected domain generally refers to an image area composed of foreground pixels with a same pixel value and adjacent to each other in an image, and the foreground pixel refers to a subject pixel. The connected domain processing refers to finding and labeling each connected domain in the image.

In detail, the ISP processor of the electronic device may detect and label each connected domain in the initial binary image. Each connected domain may be used as a candidate subject. The area of each candidate subject in the initial binary image is determined.

It is understood that the greater the area of the candidate subject, the closer the candidate subject is to the camera, and the subject closer to the camera is a subject the user wants to photograph. Therefore, when the area of each candidate subject is less than the area threshold, it means that the area of each candidate subject in the current image frame is small, and it can be considered that each candidate subject is not a moving subject or a subject that the user wants to photograph.

When the area of a candidate subject is greater than or equal to the area threshold, the candidate subject whose area is greater than or equal to the area threshold is considered as a moving subject, also a subject that the user wants to photograph. When the area of each candidate subject is less than the area threshold, it is determined that there is no moving subject in the current image frame.

With the above subject recognition method, the connected domain processing is performed on the initial binary image to determine the area of each candidate subject in the initial binary image. When there is a candidate subject having the area greater than or equal to the area threshold, it is determined that there is a moving subject in the current image frame. When the area of each candidate subject is less than the area threshold, it is determined that there is no moving subject in the current image frame. Based on the area of each candidate subject, it is possible to more accurately determine whether there is a moving subject among the candidate subjects.

In another embodiment, it may also be determined whether there is a moving subject among the candidate subjects according to a sharpness of a contour edge of each candidate subject. It is understood that when there is a moving subject in the image, the contour edge of the moving subject may be blurry to some extent in the captured image. Therefore, the sharpness of the contour edge of each candidate subject may be obtained. When the sharpness of the contour edge of a candidate subject is larger than a sharpness threshold, the candidate subject is regarded as a stationary object. When the sharpness of the contour edge of a candidate subject is smaller than or equal to the sharpness threshold, it may be considered that the candidate subject is a moving subject.

In other embodiments, feature points in each candidate subject may also be extracted, and a feature descriptor for each feature point may be generated, and whether a moving subject exists among the candidate subjects may be determined based on each feature descriptor.

The method for determining whether there is a moving subject among the candidate subjects is not limited to herein.

In an embodiment, the method further includes: when there is a moving subject in the current image frame, determining a subject area containing the moving subject in the current image frame; and dividing the subject area through a subject dividing network to obtain a target subject in the current image frame.

The subject area may be a rectangular area containing the moving subject, a circular area containing the moving subject, or an irregularly shaped area containing the moving subject, which is not limited herein.

In detail, when the ISP processor of the electronic device detects that there is a moving subject in the current image frame based on the initial binary image, it may acquire the subject area containing the moving subject in the current image frame. The subject area containing the moving subject is input into the subject dividing network to obtain the target subject. It should be noted that the target subject can be the same as the candidate subject, that is, the subject area is input into the subject dividing network and the obtained target subject is still the moving subject before the inputting. The target subject can also be different from the moving subject.

In an embodiment, the ISP processor of the electronic device can count the number of moving subjects. When the number is at least two, the subject area where the moving subject with the largest area is located is obtained, and the subject area is input into the subject dividing network to obtain the target subject.

Generally, when there are a plurality of moving subjects in the image, the subject with the largest area is usually an object captured by the user. Therefore, when the number is at least two, in order to save the calculation amount of the electronic device, the subject area where the moving subject with the largest area is located is input into the subject dividing network to obtain the target subject. When there is one moving subject, the subject area where the moving subject is located is input into the subject dividing network to obtain the target subject.

In an embodiment, when there is no moving subject among the candidate subjects, the current image frame is input into the subject dividing network to obtain the target subject.

In an embodiment, dividing the subject area through the subject dividing network to obtain the target subject in the current image frame, including: inputting the subject area containing the moving subject into the subject dividing network to obtain a subject dividing image; obtaining a target binary image of the moving subject; and fusing the subject dividing image and the target binary image to obtain the target subject in the current image frame.

The subject dividing image refers to a subject image obtained by dividing a moving area. The subject in the subject dividing image may be the same as the candidate subject before the inputting, or may be different from the candidate subject before the inputting. The fusing can refer to an and operation, which is a logical operation. For example, 0 and 1 are subjected to the and operation to obtain 0, 1 and 0 are subjected to the and operation to obtain 0, while 1 and 1 are subjected to the and operation to obtain 1. The binary image and the subject dividing image are subjected to the and operation, i.e., the and operation is performed on the pixel value of a pixel in the binary image and the pixel value of a corresponding pixel in the subject dividing image.

In detail, by means of the target binary image of the moving subject, the area including the moving subject and the area excluding the moving subject can be accurately acquired. Since the area including the moving subject can be obtained from the target binary image, and a subject dividing image containing the subject is obtained through the subject dividing network, and the target binary image and the subject segmentation image are subjected to the and operation to obtain a more accurate target subject.

In an embodiment, determining that the current image frame satisfies the motion state transition condition includes: obtaining a ratio of a subject dividing image of the previous image frame to the previous image frame; determining whether there is a moving subject in the previous image frame; and when the ratio of the subject dividing image of the previous image frame to the previous image frame is greater than a ratio threshold, and there is a moving subject in the previous image frame, determining that the current image frame satisfies the motion state transition condition.

In detail, the ISP processor of the electronic device acquires the subject dividing image of the previous image frame, and calculates the ratio of the subject dividing image to the previous image frame. The ratio threshold is obtained, and it is determined whether the calculated ratio of the subject dividing image to the previous image frame is greater than the ratio threshold. When the calculated ratio is greater than the ratio threshold, it is determined that there is a moving subject in the previous image frame. A connected domain processing result of the previous image frame is obtained, and it is determined whether the connected domain processing result of the previous image frame is that there is a moving subject in the previous image frame or that there is no moving subject in the previous image frame. When the ratio of the subject dividing image of the previous image frame to the previous image frame is greater than the ratio threshold, and there is a moving subject in the previous image frame, it is determined that the current image frame satisfies the motion state transition condition.

In the above subject recognition method, the ratio of the subject dividing image of the previous image frame to the previous image frame is obtained, and it is determined whether there is a moving subject in the previous image frame. When the ratio of the subject dividing image of the previous image frame to the previous image frame is greater than the ratio threshold, and there is a moving subject in the previous image frame, it is determined that the current image frame satisfies the motion state transition condition. In this way, it may be determined whether the current image frame is in a situation where the moving subject changes from a motion state to a stationary state. Therefore, the situation is handled accordingly, and the target subject in the current image frame which is in the situation can be accurately identified.

Figure 11:
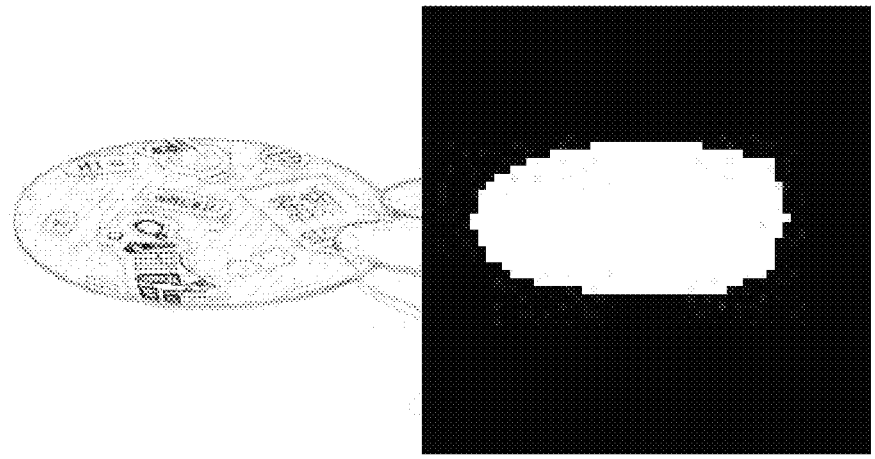
FIG. 11 is a schematic diagram of a subject dividing image and a dividing output image according to an embodiment of the present disclosure.

As illustrated in FIG. 11, the dividing result of the previous image frame is obtained, the dividing result includes the subject dividing image and a dividing output image, and a ratio of the subject dividing image to the dividing output image is calculated. As illustrated in FIG. 11, an area of the non-black region is calculated, and the ratio of the area of the non-black region to the dividing output image is calculated. When the ratio is greater than the ratio threshold, it indicates that the previous image frame has a dividing subject.

In an embodiment, determining the target subject in the current image frame based on the target subject in the previous image frame includes: obtaining a ratio of a subject dividing image of the previous image frame to the previous image frame; determining whether there is a moving subject in the previous image frame; and when the ratio of the subject dividing image of the previous image frame to the previous image frame is greater than a ratio threshold, and there is a moving subject in the previous image frame, determining that the current image frame satisfies the motion state transition condition; obtaining a subject dividing image or a target binary image of the previous image frame; determining a height and a width of a circumscribed rectangle of the subject dividing image or the target binary image of the previous image frame; increasing the height of the circumscribed rectangle by a preset height, and increasing the width of the circumscribed rectangle by a preset width; and determining a rectangle obtained after increasing the height and the width as the subject area in the current image frame.

The preset height refers to any one of a preset height value and a preset height ratio. The preset width refers to any one of a preset width value and a preset width ratio.

In detail, the ISP processor of the electronic device acquires the subject dividing image of the previous image frame, and calculates the ratio of the subject dividing image to the previous image frame. A connected domain processing result of the previous image frame is obtained, and it is determined whether the connected domain processing result of the previous image frame is that there is a moving subject in the previous image frame or that there is no moving subject in the previous image frame. When the ratio of the subject dividing image of the previous image frame to the previous image frame is greater than the ratio threshold, and there is a moving subject in the previous image frame, it is determined that the current image frame satisfies the motion state transition condition.

The ISP processor of the electronic device can acquire the subject dividing image of the previous image frame and determine the height and width of the circumscribed rectangle of the subject dividing image of the previous image frame. The height of the circumscribed rectangle is increased by the preset height value or the preset height ratio, and the width of the circumscribed rectangle is increased by the preset width value or the preset width ratio. The circumscribed rectangle obtained after increasing the height and the width is taken as the target subject area in the current image frame.

Alternatively, the ISP processor of the electronic device may acquire the target binary image of the previous image frame and determine the height and width of the circumscribed rectangle of the target binary image of the previous image frame. The height of the circumscribed rectangle is increased by the preset height value or the preset height ratio, and the width of the circumscribed rectangle is increased by the preset width value or the preset width ratio. The circumscribed rectangle obtained after increasing the height and the width is taken as the target subject area in the current image frame.

In the above embodiment, when the ratio of the subject dividing image of the previous image frame to the previous image frame is greater than the ratio threshold, and there is a moving subject in the previous image frame, it is determined that the current image frame satisfies the motion state transition condition, then the subject dividing image or the target binary image of the previous image frame is obtained. The height and the width of the circumscribed rectangle of the subject dividing image or target binary image of the previous image frame are determined. The height of the circumscribed rectangle is increased by the preset height, and the width of the circumscribed rectangle is increased by the preset width. The rectangle obtained by increasing the height and the width is taken as the subject area in the current image frame. In this way, the target subject in the current image frame can be quickly and accurately identified when the moving subject changes to a stationary state, and blurriness of the image caused by focus jumping can be avoided.

Figure 12:
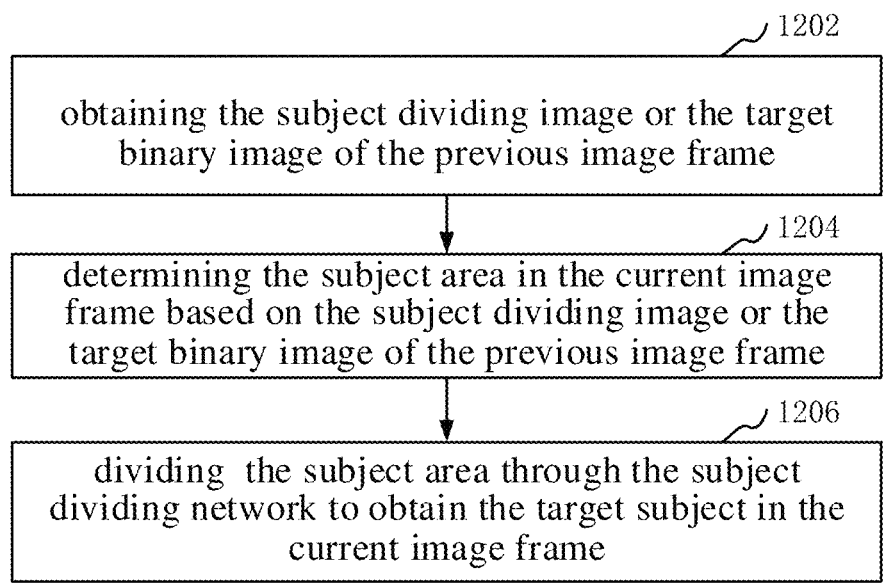
FIG. 12 is a flowchart of a process of determining a target subject in the current image frame based on a target subject in the previous image frame according to an embodiment of the present disclosure.

In an embodiment, as illustrated in FIG. 12, determining the target subject in the current image frame based on the target subject in the previous image frame includes the followings.

At block 1202, a subject dividing image or a target binary image of the previous image frame is obtained.

At block 1204, a subject area in the current image frame is determined based on the subject dividing image or the target binary image of the previous image frame.

In detail, the ISP processor of the electronic device may acquire the subject dividing image of the previous image frame, and determine the subject area in the current image frame based on the subject dividing image of the previous image frame.

In this embodiment, the ISP processor of the electronic device may acquire the target binary image corresponding to the previous image frame, and determine the subject area in the current image frame based on the target binary image corresponding to the previous image frame.

At block 1206, the subject area is divided through a subject dividing network to obtain the target subject in the current image frame.

In detail, the ISP processor of the electronic device inputs the subject area in the current image frame into the subject dividing network to obtain the target subject in the current image frame.

In the above embodiment, the subject dividing image or target binary image of the previous image frame is acquired, the subject area in the current image frame is determined based on the subject dividing image or target binary image of the previous image frame, and the subject area is divided through the subject dividing network to obtain the target subject in the current image frame. In this way, the target subject in the image can be accurately identified.

Figure 13:
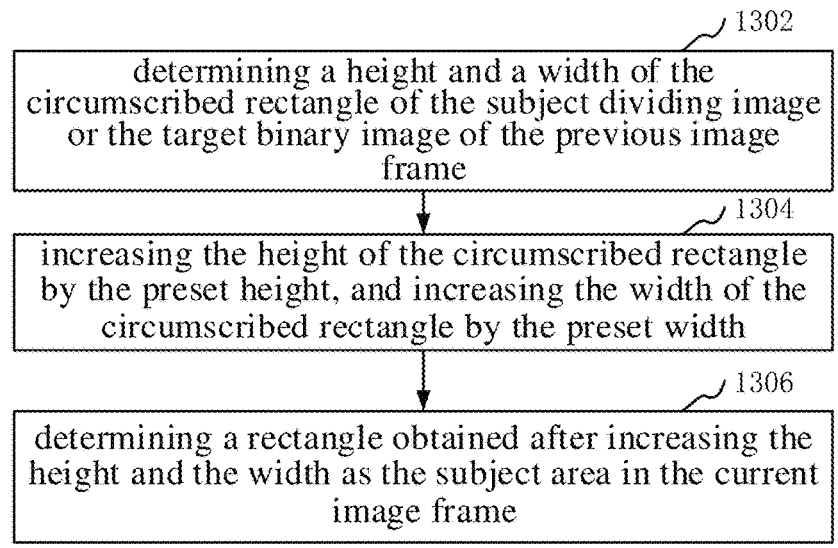
FIG. 13 is a flowchart of a process of determining a target subject area in the current image frame based on a subject dividing image or a target binary image of the previous image frame according to an embodiment of the present disclosure.

In an embodiment, as illustrated in FIG. 13, determining the subject area in the current image frame based on the subject dividing image or the target binary image of the previous image frame includes the followings.

At block 1302, a height and a width of a circumscribed rectangle of the subject dividing image or the target binary image of the previous image frame are determined.

At block 1304, the height of the circumscribed rectangle is increased by a preset height, and the width of the circumscribed rectangle is increased by a preset width.

In detail, the ISP processor of the electronic device may acquire the subject dividing image of the previous image frame, determine the circumscribed rectangle of the subject dividing image, and determine the height and the width of the circumscribed rectangle. A preset height value is obtained and added to the height of the circumscribed rectangle, and a preset width value is obtained and added to the width of the circumscribed rectangle, so as to obtain a first circumscribed rectangle.

In this embodiment, the ISP processor of the electronic device can obtain a preset height ratio and increase the height of the circumscribed rectangle of the subject dividing image by the preset height ratio, and can obtain a preset width ratio and increase the width of the circumscribed rectangle of the subject dividing image by the preset width ratio, so as to obtain the second circumscribed rectangle.

In this embodiment, the ISP processor of the electronic device may acquire the target binary image of the previous image frame, determine the circumscribed rectangle of the target binary image, and determine the height and the width of the circumscribed rectangle. And a preset height value is obtained and added to the height of the circumscribed rectangle, and a preset width value is obtained and added to the width of the circumscribed rectangle, so as to obtain a third circumscribed rectangle.

In this embodiment, the ISP processor of the electronic device may obtain a preset height ratio and increase the height of the circumscribed rectangle of the target binary image by the preset height ratio, and may obtain a preset width ratio and increase the width of the circumscribed rectangle of the target binary image by the preset width ratio, so as to obtain a fourth circumscribed rectangle.

For example, the height and the width of the circumscribed rectangle of the subject dividing image or the target binary image are h and w, respectively, the height of the circumscribed rectangle is increased by h/4, and the width of the circumscribed rectangle is increased by w/4. A position of the expanded rectangular is recorded as a position of the subject target area in the current image frame.

At block 1306, a rectangle obtained after increasing the height and the width is determined as the subject area in the current image frame.

In detail, the ISP processor of the electronic device uses the first circumscribed rectangle obtained by increasing the height by the preset height value and increasing the width by the preset width value as the target subject area in the current image frame.

In this embodiment, the ISP processor of the electronic device may use the second circumscribed rectangle obtained by increasing the height by the preset height ratio and increasing the width by the preset width ratio as the target subject area in the current image frame.

In this embodiment, the ISP processor of the electronic device may use the third circumscribed rectangle obtained by increasing the height by the preset height value and increasing the width by the preset width value as the target subject area in the current image frame.

In this embodiment, the ISP processor of the electronic device may use the fourth circumscribed rectangle obtained by increasing the height by the preset height ratio and increasing the width by the preset width ratio as the target subject area in the current image frame.

With the subject recognition method in this embodiment, the height and the width of the circumscribed rectangle of the subject dividing image or the target binary image of the previous image frame are determined, the height of the circumscribed rectangle is increased by the preset height, and the width of the circumscribed rectangle is increased by the preset width. The rectangle obtained by increasing the height and width is determined as the target subject area in the current image frame. In this way, the subject area in the current image frame can be accurately determined, so that the target subject in the current frame can be quickly and accurately recognized when the moving subject changes to a stationary state, thereby avoiding blurriness caused by focus jumping.

Figure 14:
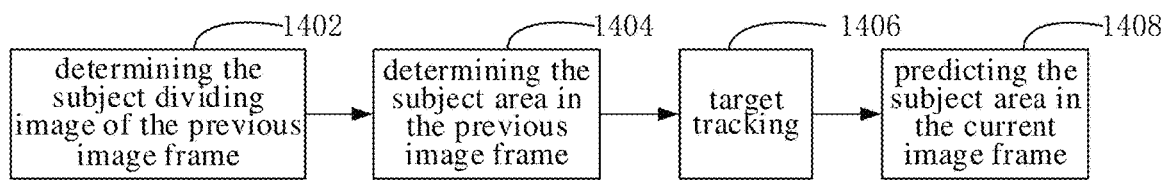
FIG. 14 is a schematic diagram of a process of determining the target subject area in the current image frame based on the subject dividing image and a subject area of the previous image frame according to an embodiment of the present disclosure.

In an embodiment, as illustrated in FIG. 14, determining the target subject in the current image frame based on the target subject in the previous image frame includes: acquiring a subject dividing image and a subject area of the previous image frame; based on the subject dividing image and the subject area of the previous image frame, determining a subject area in the current image frame; and dividing the subject area in the current image frame through a subject dividing network to obtain the target subject in the current image frame.

In detail, when predicting the subject area in the current image frame, moving target tracking methods are adopted, including but not limited to using filter-based target tracking methods, optical flow-based target tracking methods, template-based target tracking methods, and CNN-based target tracking methods. After acquiring a subject area 1404 in the previous image frame based on a subject dividing image 1402 of the previous image frame, an act at block 1406, i.e., target tracking is executed, a target tracking method is adopted to predict a subject area 1408 in the current image frame. The subject area in the current image frame is divided through the subject dividing network to obtain the target subject in the current image frame.

Figure 15:
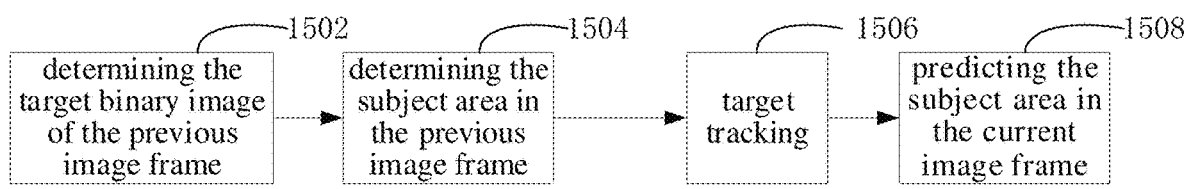
FIG. 15 is a schematic diagram of a process of determining the target subject area in the current image frame according to the target binary image and the subject area of the previous image frame according to an embodiment of the present disclosure.

In an embodiment, as illustrated in FIG. 15, determining the target subject in the current image frame based on the target subject in the previous image frame includes: obtaining a target binary image or a subject area of the previous image frame; determining a subject area in the current image frame based on the target binary image or the subject area of the previous image frame; and dividing the subject area in the current image frame through a subject dividing network to obtain the target subject in the current image frame.

In detail, after acquiring a subject area 1504 in the previous image frame based on a target binary image 1502 of the previous image frame, an act at block 1506, that is, target tracking is performed, a subject area 1508 in the current image frame is predicted by a target tracking method. The subject area in the current image frame is divided through the subject dividing network to obtain the target subject in the current image frame.

In an embodiment, when the current image frame satisfies the motion state transition condition and the subject area in the current image frame is determined, then the subject area in the current image frame may be input into the subject dividing network to obtain the target subject in the current image frame.

In an embodiment, when the current image frame satisfies the motion state transition condition and the subject area in the current image frame is determined, then the determination result indicating that there is no moving subject in the current image frame is modified to indicate that there is a moving subject in the current image frame.

In an embodiment, the method further includes: when the current image frame does not satisfy the motion state transition condition, inputting the current image frame into the subject dividing network to obtain the target subject in the current image frame.

In detail, the motion state transition condition includes following conditions that: there is no moving subject in the current image frame, the ratio of the subject dividing image of the previous image frame to the previous image frame is greater than the ratio threshold, and there is a moving subject in the previous image frame. When the current image frame does not satisfy any of the above three conditions, then the motion state transition condition is not satisfied, which means that there is no situation in the current image frame that a state of the moving subject changes. Then, the current image frame is input into the subject dividing network to obtain the target subject in the current image frame, which can avoid unrecognizable situations when there is no significant subject in the image.

In another embodiment, after acquiring the target subject, target tracking is performed on the target subject to save the calculation amount of the electronic device. Further, after the target tracking is performed on the target subject for a preset number of image frames, the current image frame is acquired, and the subject detection is performed on the current image frame to retrieve the target subject.

In an embodiment, the method further includes: focusing based on the target subject in the current image frame.

Focusing refers to a process of changing an object distance and an image distance through a focusing mechanism of a camera to make the image of the object clear.

After the subject detection is performed on the current image frame and the target subject is obtained, the target subject is considered as the object captured by the camera. Therefore, by focusing to a position of the target subject in actual scene, a next image frame of the target subject captured by the camera is clearer.

In detail, the ISP processor of the electronic device controls the camera to move and focus to the position corresponding to the target subject, so that the next image frame of the target subject having a higher clearness can be obtained. The current image frame is used as the previous image frame, and the next image frame is used as the current image frame, and it is detected whether there is a moving subject in the current image frame. When there is no moving subject in the current image frame, a motion state transition condition is obtained. When the current image frame satisfies the motion state transition condition, a target subject in the previous image frame is acquired, and a target subject in the current image frame is determined based on the target subject in the previous image frame. In this way, a clearer target video of the target subject can be produced. The current image frame may be used to correct the previous image frame, and based on the corrected images, a clearer target video of the target subject is obtained.

Figure 16:
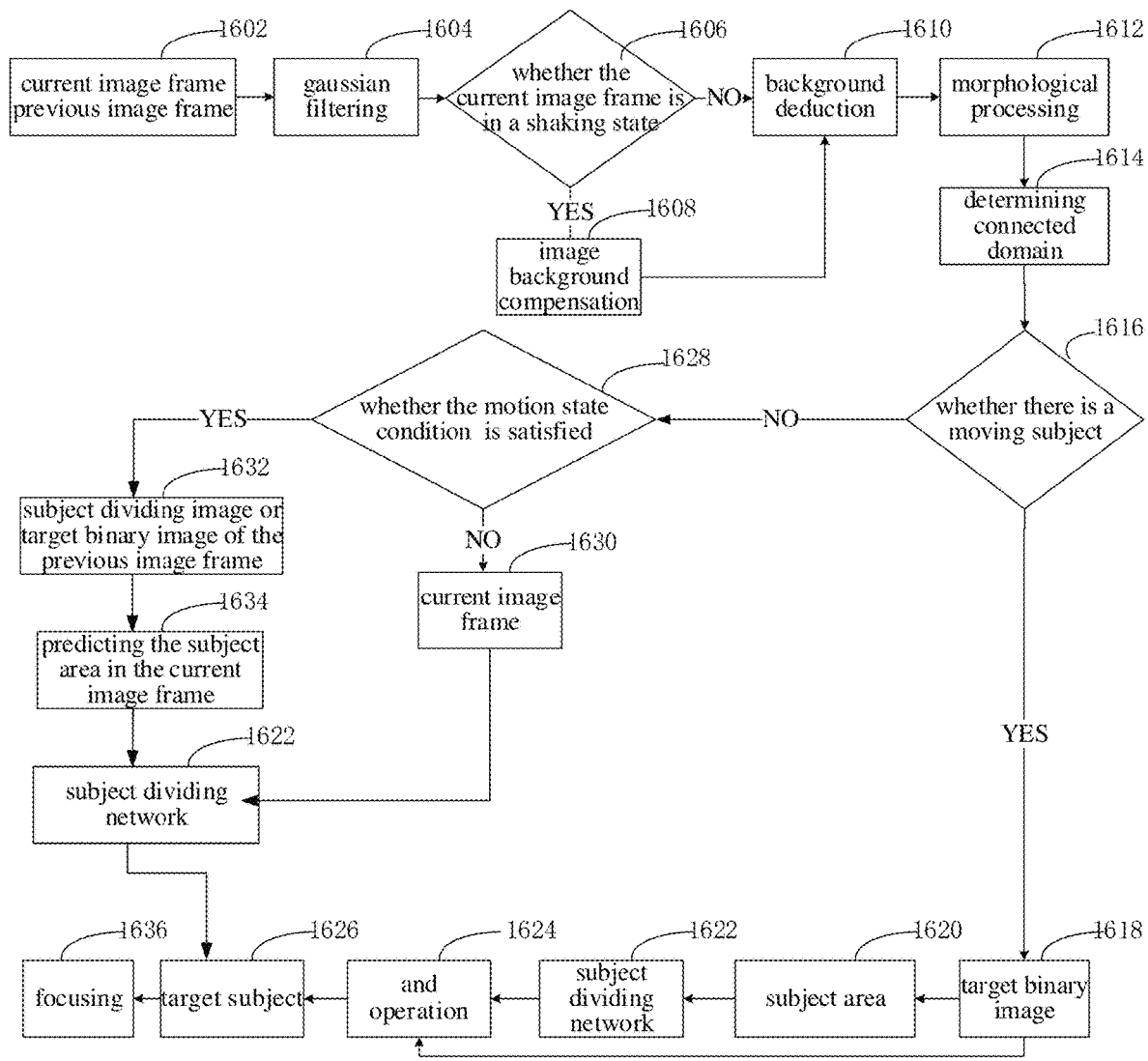
FIG. 16 is a schematic diagram of subject recognition according to an embodiment of the present disclosure.

In an embodiment, as illustrated in FIG. 16, a current image frame and a previous image frame 1602 are obtained, at block 1604, Gaussian filtering is performed on the current image frame and the previous image frame, which can remove high-frequency noise brought by a complex background containing a lot of texture details in the image and high-frequency noise brought by image down-sampling, thereby preventing false detection of the subsequent subject detection.

At block 1606, the current image frame after the Gaussian filtering is detected, and it is determined whether the current image frame is in a shaking state. When the current image frame is in the shaking state, at block 1608, image background compensation is performed on the current image frame. The image background compensation refers to obtaining a target point pair from the current image frame and the previous image frame, obtaining a transformation matrix between the current image frame and the previous image frame based on the target point pair, and correcting the previous image frame based on the transformation matrix to obtain the corrected previous image frame. The target point pair may include at least one of a tracking point pair and a matching point pair.

An act at block 1610 is executed according to the corrected previous image frame, that is, background deduction processing is performed on the current image frame to obtain an initial binary image of the current image frame.

The initial binary image includes a background area and a subject area. The background deduction processing may include: updating a background detection model based on the corrected previous image frame, and performing background detection on the current image frame based on the updated background detection model to obtain the initial binary image of the current image frame. The background detection model includes a first background detection model and a second background detection model. When performing the background detection on the current image frame through the first background detection model, the second background detection model is used as a candidate background detection model. When performing the background detection on the current image frame through the second background detection model, the first background detection model is used as a candidate background detection model. Each of the first background detection model and the second background detection model may be a single Gaussian model, which not only ensures the accuracy of subject detection, but also avoids a high calculation amount.

In another embodiment, the background area is mapped back to the current image frame, and at block 1612, morphological processing is performed on the current image frame in which the background area is detected. The morphological processing refers to performing erosion on the current image frame containing the detected background area and then performing dilation on the image so as to remove noise in the image and reduce holes in the initial binary image.

At block 1614, a connected domain of the current image frame is determined after the morphological processing. Connected domain refers to a closed and internally connected area. By determining the connected domain, some holes in each candidate subject are eliminated to obtain a more accurate candidate subject.

After obtaining an area of each candidate subject, at block 1616, it is determined whether there is a moving subject among the candidate subjects. When there is a candidate subject whose area is greater than or equal to an area threshold among the candidate subjects, it is determined that there is a moving subject among the candidate subjects, and at block 1618, a target binary image of the moving subject is obtained.

The target binary image includes a moving subject and a background area. A subject area 1620 where the moving subject is located is obtained through the target binary image.

The subject area is input into a subject dividing network 1622, and a subject dividing image is obtained.

At block 1624, an and operation is performed on the target binary image 1618 and the subject dividing image to obtain the target subject 1626.

When the area of each candidate subject is less than the area threshold, it is determined that there is no moving subject among the candidate subjects. An act at block 1628 is executed to determine whether the current image frame satisfies the motion state transition condition. When the current image frame does not satisfy the motion state transition condition, an act at block 1630 is executed to input the current image frame into the subject dividing network to obtain the target subject.

When the current image frame satisfies the motion state transition condition, an act at block 1632 is executed to obtain a subject dividing image or a target binary image of the previous image frame, and at block 1634, the subject area in the current image frame is predicted based on the subject dividing image or the target binary image of the previous image frame. At block 1622, the subject area in the current image frame is inputted into the subject dividing network to obtain the target subject.

At block 1636, the target subject may be focused obtain a clear next image frame of the target subject. Taking the current image frame as the previous image frame and the next image frame as the current image frame, it is detected whether there is a moving subject in the current image frame. When there is no moving subject in the current image frame, a motion state transition condition is obtained, when the current image frame satisfies the motion state transition condition, a target subject in the previous image frame is obtained. A target subject in the current image frame is determined based on the target subject in the previous image frame. In this way, a clearer target video of the target subject may be generated. The current image frame may be used to correct the previous image frame, and based on the corrected images, a clear target video of the target subject can be obtained.

It should be understood that although the acts in the flowcharts of FIG. 2 to FIG. 16 are displayed in sequence by the arrows, the steps are not necessarily executed in the order indicated by the arrows. Unless clearly specified in this disclosure, an execution order of these acts is not strictly limited, and these acts can be executed in other orders. Moreover, at least some of the acts in FIGS. 2-16 may include multiple sub-steps or have multiple stages. These sub-steps or stages are not necessarily executed at the same time, but may be executed at different times. These sub-steps or the stages are not necessarily executed sequentially, but may be executed in turn or alternately with other steps or at least a part of sub-steps or stages of other steps.

Figure 17:
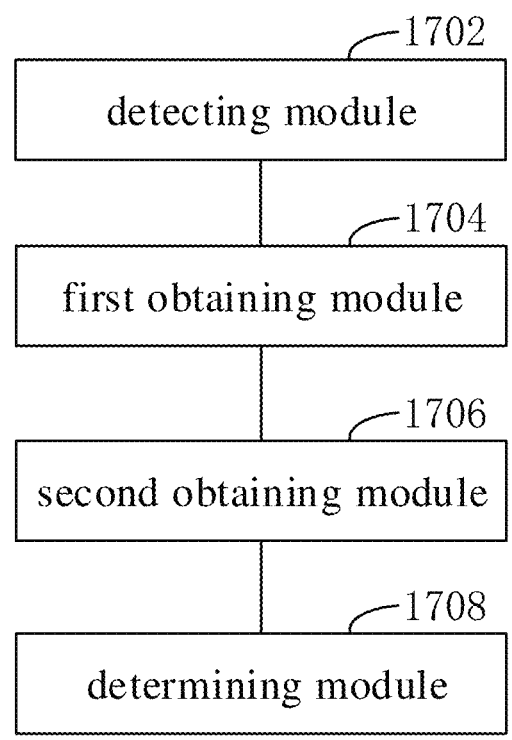
FIG. 17 is a block diagram of a subject recognition apparatus according to an embodiment of the present disclosure.

FIG. 17 is a structural diagram of a subject recognition apparatus according to an embodiment of the present disclosure. As illustrated in FIG. 17, the subject recognition apparatus includes: a detecting module 1702, a first obtaining module 1704, a second obtaining module 1706, and a determining module 1708.

The detecting module 1702 is configured to obtain a current image frame and detect whether there is a moving subject in the current image frame.

The first obtaining module 1704 is configured to, in response to detecting that there is no moving subject in the current image frame, obtain a motion state transition condition.

The second obtaining module 1706 is configured to, when the current image frame satisfies the motion state transition condition, obtain a target subject in a previous image frame.

The determining module 1708 is configured to determine a target subject in the current image frame based on the target subject in the previous image frame.

With the image recognition apparatus in this embodiment, the current image frame is obtained and it is detected whether there is a moving subject in the current image frame. When there is no moving subject in the current image frame, the motion state transition condition is obtained. When the current image frame satisfies the motion state transition condition, the target subject in the previous image frame is obtained, and the target subject in the current image frame is determined based on the target subject in the previous image frame. In this way, a more accurate target subject can be obtained, and the accuracy of subject identification can be improved.

In an embodiment, the detecting module 1702 is configured to: detect a state of the current image frame, the state of the current image frame including a non-shaking state and a shaking state; when the current image frame is in the non-shaking state, perform background deduction processing on the current image frame to obtain an initial binary image; and detect the moving subject in the current image frame based on the initial binary image.

In an embodiment, the state of the current image frame is detected, which includes the non-shaking state and the shaking state. When the current image frame is in the non-shaking state, the background deduction processing is performed on the current image frame to obtain the initial binary image; and the moving subject in the current image frame is detected based on the initial binary image. The target subject in the current image frame can be more accurately identified through the binary image, which improves the accuracy of subject recognition.

In an embodiment, the first obtaining module 1704 is further configured to: obtain a previous image frame of the current image frame; compare the current image frame with the previous image frame to obtain a scene change value of the current image frame, the scene change value representing a degree of change in a scene between the current image frame and the previous image frame; when the scene change value is greater than a scene threshold, determine that the current image frame is in the shaking state; and when the scene change value is less than or equal to the scene threshold, determine that the current image frame is in the non-shaking state.

With the above subject recognition apparatus, the previous image frame of the current image frame is obtained and compared with the current image frame, to obtain the scene change value corresponding to the current image frame. When the scene change value is greater than the threshold, it indicates that the degree of change in the scene between the current image frame and the previous image frame is large, and the current image frame is in the shaking state. In this way, the accuracy of determining whether the current image frame is in the shaking state may be improved.

In an embodiment, the first obtaining module 1704 is further configured to: obtain a previous image frame of the current image frame; perform differential processing on the current image frame and the previous image frame, and perform binary processing on an image obtained after the differential processing to obtain a differential binary image; determine a total value of pixels in the differential binary image; when the total value is greater than a total value threshold, determine that the current image frame is in the shaking state; and when the total value is less than or equal to the total value threshold, determine that the current image frame is in the non-shaking state.

With the above subject recognition apparatus, the differential processing is performed on the current image frame and the previous image frame, and the binary processing is performed on the image after the differential processing to obtain the differential binary image. The total value of the pixels in the differential binary image is calculated. When the total value is greater than the total value threshold, it means that there is a great difference between the pixels in the current image frame and the previous image frame, and the current image frame is considered to be in the shaking state. When the total value is less than or equal to the total value threshold, it means that there is a small difference between the pixels in the current image frame and the previous image frame, and it is determined that the current image frame is in the non-shaking state. In this way, the accuracy of determining whether the current image frame is in the shaking state can be improved.

In an embodiment, the first obtaining module 1704 is further configured to: determine a pixel value of each pixel in the current image frame; determine a first pixel value vector of the current image frame based on the pixel value of each pixel in the current image frame, the first pixel value vector representing a distribution of the pixel value of each pixel in the current image frame; obtain the previous image frame of the current image frame, and determine a pixel value of each pixel in the previous image frame; determine a second pixel value vector of the previous image frame based on the pixel value of each pixel in the previous image frame, the second pixel value vector representing a distribution of the pixel value of each pixel in the previous image frame; determine a vector distance between the current image frame and the previous image frame based on the first pixel value vector and the second pixel value vector; when the vector distance is greater than a distance threshold, determine that the current image frame is in the shaking state; and when the vector distance is less than or equal to the distance threshold, determine that the current image frame is in the non-shaking state.

With the above subject recognition apparatus, the first pixel value vector of the current image frame is determined based on the pixel value of each pixel in the current image frame, and the second pixel value vector of the previous image frame is determined based on the pixel value of each pixel in the previous image frame. A degree of color difference between the current image frame and the previous image frame is determined based on the first pixel value vector and the second pixel value vector, that is, the vector distance between the current image frame and the previous image frame is obtained. When the vector distance is greater than the distance threshold, it indicates that the color difference between the current image frame and the previous image frame is large, and it is considered that the current image frame is in the shaking state. In this way, the accuracy of determining whether the current image frame is in the shaking state can be improved.

In an embodiment, the detecting module 1702 is further configured to: when the current image frame is in the shaking state, obtain the previous image frame of the current image frame, and perform correction processing on the previous image frame based on the current image frame; and perform background deduction processing on the current image frame based on the corrected previous image frame to obtain the initial binary image.

In an embodiment, the detecting module 1702 is further configured to: obtain a target point pair from the current image frame and the previous image frame; determine a transformation matrix between the current image frame and the previous image frame based on the target point pair; and perform the correction processing on the previous image frame based on the transformation matrix.

With the above subject recognition apparatus, when it is detected that the current image frame is in the shaking state, the target point pair is obtained from the current image frame and the previous image frame. Based on the target point pair, a more accurate transformation matrix between the current image frame and the previous image frame can be obtained.

In an embodiment, the detecting module 1702 is further configured to: divide the current image frame in a preset mode to obtain sub-areas of the current image frame; divide the previous image frame in the preset mode to obtain sub-areas of the previous image frame corresponding respectively to the sub-areas of the current image frame; obtain a preset number of random points from the sub-areas of the current image frame and the sub-areas of the previous image frame, respectively; generate the tracking point pair based on the random points in the sub-areas of the current image frame and the random points in the sub-areas of the previous image frame; and extract feature points from the current image frame and the previous image frame respectively; and generate the matching point pair based on the feature points from the current image frame and the feature points from the previous image frame.

With the above subject recognition apparatus, the tracking point pairs are generated by extracting the random points, which improves randomness of the target point pair and avoids the problem of low accuracy of the subsequently obtained transformation matrix due to shortage of the target point pairs in a weakly textured area. In this way, the extracted target point pairs have a better global distribution, such that the accuracy of the transformation matrix may be improved, thereby improving the accuracy of subject recognition.

In an embodiment, the detecting module 1702 is further configured to: perform optical flow tracking on the current image frame and the previous image frame to obtain a motion vector of the current image frame and the previous image frame; and map the random points in the previous image frame to the current image frame by the motion vector to generate the tracking point pair.

With the above subject recognition apparatus, by performing the optical flow tracking on the current image frame and the previous image frame, the motion vector of the current image frame and the previous image frame is obtained. The random points in the previous image frame are mapped to the current image frame by the motion vector to generate a more accurate tracking point pair.

In an embodiment, the detecting module 1702 is further configured to: perform vector filtering on the random points in the current image frame and the random points in the previous image frame to obtain a target random point in the current image frame and a target random point in the previous image frame; and map the target random point in the previous image frame to the current image frame by the motion vector to generate the tracking point pair. By performing vector filtering on the random points in the current image frame and the random points in the previous image frame, some erroneous random points can be removed, thereby obtaining a more accurate tracking point pair.

In an embodiment, the detecting module 1702 is further configured to: generate feature descriptors corresponding respectively to the feature points from the current image frame; generate feature descriptors corresponding respectively to the feature points from the previous image frame; and match the feature descriptors corresponding to the current image frame with the feature descriptors corresponding to the previous image frame to obtain the matching point pair. The feature descriptor corresponding to each feature point in the current image frame is matched with the feature descriptor corresponding to each feature point in the previous image frame to generate a more accurate matching point pair.

In an embodiment, the detecting module 1702 is further configured to: perform connected domain processing on the initial binary image to determine an area of each candidate subject in the initial binary image; when there is a candidate subject having the area greater than or equal to an area threshold, determine that there is a moving subject in the current image frame; and when the area of each candidate subject is smaller than the area threshold, determine that there is no moving subject in the current image frame.

With the above subject recognition apparatus, the connected domain processing is performed on the initial binary image to determine the area of each candidate subject in the initial binary image. When there is a candidate subject having the area greater than or equal to the area threshold, it is determined that there is a moving subject in the current image frame. When the area of each candidate subject is smaller than the area threshold, it is determined that there is no moving subject in the current image frame. Based on the area of each candidate subject, it can be more accurately determined whether there is a moving subject among the candidate subjects.

In an embodiment, the second obtaining module 1706 is further configured to: when there is a moving subject in the current image frame, determine that the current image frame contains a subject area of the moving subject; and divide the subject area through a subject dividing network to obtain a target subject in the current image frame.

In an embodiment, the second obtaining module 1706 is further configured to: input the subject area containing the moving subject into the subject dividing network to obtain a subject dividing image; obtain a target binary image of the moving subject; and fuse the subject dividing image and the target binary image to obtain the target subject in the current image frame. The area of the moving subject can be obtained from the target binary image, and another subject dividing image containing the subject can be obtained through the subject dividing network, and the target binary image and the subject dividing image are processed to obtain a more accurate target subject.

In an embodiment, the second obtaining module 1706 is further configured to: obtain a ratio of a subject dividing image of the previous image frame to the previous image frame; determine whether there is a moving subject in the previous image frame; and when the ratio of the subject dividing image of the previous image frame to the previous image frame is greater than a ratio threshold, and there is a moving subject in the previous image frame, determine that the current image frame satisfies the motion state transition condition.

With the above subject recognition apparatus, the ratio of the subject dividing image of the previous image frame to the previous image frame is obtained. Whether there is a moving subject in the previous image frame is determined. When the ratio of the subject dividing image of the previous image frame to the previous image frame is greater than the ratio threshold, and there is a moving subject in the previous image frame, it is determined that the current image frame satisfies the motion state transition condition. In this way, it can be determined whether the current image frame is in a situation where the moving subject changes from a motion state to a stationary state, so that the situation can be handled accordingly, and the target subject in the current image frame which is in the situation can be accurately identified.

In an embodiment, the determining module 1708 is further configured to: obtain the subject dividing image or the target binary image of the previous image frame; determine a height and a width of a circumscribed rectangle of the subject dividing image or the target binary image of the previous image frame; increase the height of the circumscribed rectangle by a preset height, and increase the width of the circumscribed rectangle by a preset width; and determine a rectangle obtained after increasing the height and the width as the subject area in the current image frame.

In the above embodiments, when the ratio of the subject dividing image of the previous image frame to the previous image frame is greater than the ratio threshold, and there is a moving subject in the previous image frame, it is determined that the current image frame satisfies the motion state transition condition, and the subject dividing image or the target binary image of the previous image frame is obtained to determine the height and width of the circumscribed rectangle of the subject dividing image or the target binary image of the previous image frame, the height of the circumscribed rectangle is increased by the preset height, and the width of the circumscribed rectangle is increased by the preset width, and the rectangle obtained by increasing the height and width is determined as the subject area in the current image frame. In this way, the target subject in the current image frame can be quickly and accurately identified when the moving subject changes to a stationary state, and blurriness of the image caused by focus jumping can be avoided.

In an embodiment, the determining module 1708 is further configured to: obtain the subject dividing image or the target binary image of the previous image frame; determine the subject area in the current image frame based on the subject dividing image or the target binary image of the previous image frame; and divide the subject area through the subject dividing network to obtain the target subject in the current image frame.

In the above embodiment, the subject dividing image or target binary image of the previous image frame is acquired, the subject area in the current image frame is determined based on the subject dividing image or the target binary image of the previous image frame. The subject area is divided through the subject dividing network to obtain the target subject in the current image frame, which can accurately identify the target subject in the image.

In an embodiment, the determining module 1708 is further configured to: determine a height and a width of the circumscribed rectangle of the subject dividing image or the target binary image of the previous image frame; increase the height of the circumscribed rectangle by the preset height, and increase the width of the circumscribed rectangle by the preset width; and determine a rectangle obtained after increasing the height and the width as the target subject area in the current image frame.

With the above subject recognition apparatus, the height and width of the circumscribed rectangle of the subject dividing image or the target binary image of the previous image frame are determined. The height of the circumscribed rectangle is increased by the preset height, and the width of the circumscribed rectangle is increased by the preset width. The rectangle obtained after increasing the height and the width is determined as the target subject area in the current image frame. The subject area in the current image frame can be accurately determined, so that the target subject in the current image frame can be quickly and accurately identified when the moving subject changes to a stationary state, to avoid blurriness caused by focus jumping.

In an embodiment, the determining module 1708 is further configured to: when the current image frame does not satisfy the motion state transition condition, input the current image frame into a subject dividing network to obtain the target subject in the current image frame. When the current image frame does not satisfy any of the three conditions, the motion state transition condition is not satisfied, which means that there is no situation in the current image frame that a state of the moving subject changes. Then, the current image frame is input into the subject dividing network to obtain the target subject in the current image frame, which can avoid the unrecognizable situation when there is no significant subject in the image.

In an embodiment, the apparatus further includes: a focusing module. The focusing module is used to focus based on the target subject in the current image frame. The current image frame may be used to correct the previous image frame, and based on the corrected images, a clearer target video of the target subject can be obtained.

The division of modules in the above-mentioned subject recognition apparatus is for illustration only. In other embodiments, the subject recognition apparatus may be divided into different modules as needed to complete all or part of the functions of the above subject recognition apparatus.

Figure 18:
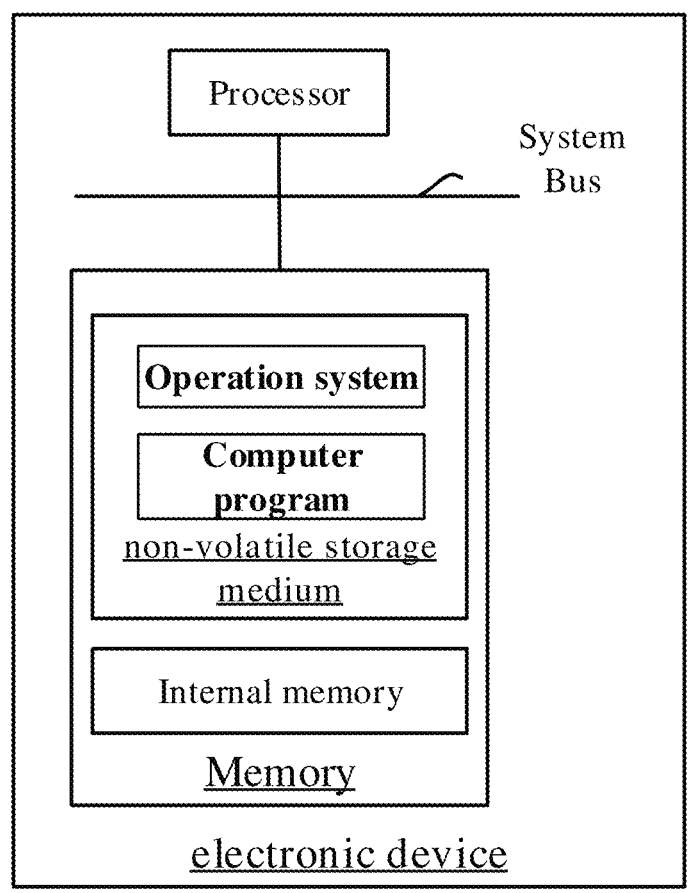
FIG. 18 is a schematic diagram of an internal structure of an electronic device according to an embodiment of the present disclosure.

FIG. 18 is a schematic diagram of an internal structure of an electronic device according to an embodiment of the present disclosure. As illustrated in FIG. 18, the electronic device includes a processor and a memory connected by a system bus. The processor is used to provide computing and control capabilities to support operations of the entire electronic device. The memory may include a non-volatile storage medium and an internal memory. The non-volatile storage medium stores an operating system and computer programs. The computer program is executed by the processor to implement a subject recognition method according to the following embodiments. The internal memory provides a cached operating environment for the operating system and the computer programs in the non-volatile storage medium. The electronic device may be a mobile phone, a tablet computer, a personal digital assistant or a wearable device.

Each module in the subject recognition apparatus according to the embodiments of the present disclosure may be implemented in the form of a computer program. The computer program may run on a terminal or a server. The program module composed of the computer programs may be stored in the memory of the terminal or the server. When the computer program is executed by the processor, the steps of the method according to the embodiments of the present disclosure are implemented.

The embodiments of the present disclosure also provide a computer-readable storage medium, and one or more non-volatile computer-readable storage media containing computer-executable instructions, when the computer-executable instructions are executed by the one or more processors, the one or more processors are caused to perform the steps of the subject recognition method.

A computer program product containing instructions is provided. When the instructions are running on a computer, the computer is caused to perform a subject recognition method.

Any reference to memory, storage, database, or other media used in this application may include non-volatile and/or volatile memory. Suitable non-volatile memory may include read-only memory (ROM), programmable ROM (PROM), electrically programmable ROM (EPROM), electrically erasable programmable ROM (EEPROM), or flash memory. Volatile memory can include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The above-mentioned embodiments only express several implementations of the present application, and the descriptions thereof are more specific and detailed, but cannot be understood as limiting the scope of the present disclosure. It should be noted that, for those of ordinary skill in the art, without departing from the concept of the present application, several modifications and improvements can be made, and these all belong to the protection scope of the present application. Therefore, the protection scope of this application shall be referred to the appended claims.

What is claimed is:

1. A method for subject recognition, comprising:
obtaining a current image frame and detecting whether there is a moving subject in the current image frame;
in response to detecting that there is no moving subject in the current image frame, obtaining a motion state transition condition;
when the current image frame satisfies the motion state transition condition, obtaining a target subject in a previous image frame; and
determining a target subject in the current image frame based on the target subject in the previous image frame;
wherein the determining that the current image frame satisfies the motion state transition condition comprises:
obtaining a ratio of a subject dividing image of the previous image frame to the previous image frame;
determining whether there is a moving subject in the previous image frame; and
when the ratio of the subject dividing image of the previous image frame to the previous image frame is greater than a ratio threshold and there is a moving subject in the previous image frame, determining that the current image frame satisfies the motion state transition condition.

2. The method of claim 1, wherein the detecting whether there is a moving subject in the current image frame comprises:
detecting a state of the current image frame, wherein the state of the current image frame comprises a non-shaking state and a shaking state;
in response to detecting that the current image frame is in the non-shaking state, performing background deduction processing on the current image frame to obtain an initial binary image; and
detecting whether there is a moving subject in the current image frame based on the initial binary image.

3. The method of claim 2, wherein the detecting the state of the current image frame comprises:
obtaining the previous image frame of the current image frame;
comparing the current image frame with the previous image frame to obtain a scene change value of the current image frame, wherein the scene change value represents a degree of change in a scene between the current image frame and the previous image frame;
when the scene change value is greater than a scene threshold, determining that the current image frame is in the shaking state; and
when the scene change value is less than or equal to the scene threshold, determining that the current image frame is in the non-shaking state.

4. The method of claim 2, wherein the detecting the state of the current image frame comprises:
obtaining the previous image frame of the current image frame;
performing differential processing on the current image frame and the previous image frame to obtain a differential-processed image, and performing binary processing on the differential-processed image to obtain a differential binary image;
determining a total value of pixels in the differential binary image;
when the total value is greater than a total value threshold, determining that the current image frame is in the shaking state; and
when the total value is less than or equal to the total value threshold, determining that the current image frame is in the non-shaking state.

5. The method of claim 2, wherein the detecting the state of the current image frame comprises:
determining a pixel value of each pixel in the current image frame;
determining a first pixel value vector of the current image frame based on the pixel value of each pixel in the current image frame, wherein the first pixel value vector represents a distribution of the pixel value of each pixel in the current image frame;
obtaining the previous image frame of the current image frame, and determining a pixel value of each pixel in the previous image frame;
determining a second pixel value vector of the previous image frame based on the pixel value of each pixel in the previous image frame, wherein the second pixel value vector represents a distribution of the pixel value of each pixel in the previous image frame;
determining a vector distance between the current image frame and the previous image frame based on the first pixel value vector and the second pixel value vector;
when the vector distance is greater than a distance threshold, determining that the current image frame is in the shaking state; and
when the vector distance is less than or equal to the distance threshold, determining that the current image frame is in the non-shaking state.

6. The method of claim 2, further comprising:
in response to detecting that the current image frame is in the shaking state, obtaining the previous image frame of the current image frame, and performing correction processing on the previous image frame based on the current image frame to obtain a corrected image; and
performing background deduction processing on the current image frame based on the corrected image to obtain the initial binary image.

7. The method of claim 6, wherein the performing the correction processing on the previous image frame based on the current image frame comprises:
obtaining a target point pair from the current image frame and the previous image frame;
determining a transformation matrix between the current image frame and the previous image frame based on the target point pair; and
performing the correction processing on the previous image frame based on the transformation matrix.

8. The method of claim 7, wherein the target point pair comprises at least one of a tracking point pair or a matching point pair;
wherein the tracking point pair is generated by:
dividing the current image frame in a preset mode to obtain sub-areas of the current image frame;
dividing the previous image frame in the preset mode to obtain sub-areas of the previous image frame corresponding respectively to the sub-areas of the current image frame;
obtaining a preset number of random points from the sub-areas of the current image frame and the sub-areas of the previous image frame, respectively; and generating the tracking point pair based on the random points in the sub-areas of the current frame image and the random points in the sub-areas of the previous frame image; and wherein the matching point pair is generated by:
extracting feature points from the current image frame and the previous image frame respectively; and
generating the matching point pair based on the feature points from the current image frame and the previous image frame.

9. The method of claim 8, wherein the generating the tracking point pair based on the random points in the sub-areas of the current frame image and the random points in the sub-areas of the previous frame image, comprises:
performing optical flow tracking on the current image frame and the previous image frame to obtain a motion vector of the current image frame and the previous image frame; and
mapping the random points in the previous image frame to the current image frame by the motion vector to generate the tracking point pair.

10. The method of claim 9, further comprising:
performing vector filtering on the random points in the current image frame and the random points in the previous image frame to obtain a target random point in the current image frame and a target random point in the previous image frame; and
wherein the mapping the random points in the previous image frame to the current image frame by the motion vector to generate the tracking point pair comprises:
mapping the target random point in the previous image frame to the current image frame by the motion vector to generate the tracking point pair.

11. The method of claim 8, wherein the generating the matching point pair based on the feature points from the current image frame and the previous image frame comprises:
generating feature descriptors corresponding respectively to the feature points from the current image frame;
generating feature descriptors corresponding respectively to the feature points from the previous image frame; and
matching the feature descriptors corresponding to the current image frame and the feature descriptors corresponding to the previous image frame to obtain the matching point pair.

12. The method of claim 2, wherein the detecting whether there is a moving subject in the current image frame based on the initial binary image comprises:
performing connected domain processing on the initial binary image to determine an area of each candidate subject in the initial binary image;
when there is a candidate subject having the area greater than or equal to an area threshold, determining that there is a moving subject in the current image frame; and
when the area of each candidate subject is smaller than the area threshold, determining that there is no moving subject in the current image frame.

13. The method of claim 1, further comprising:
in response to detecting that there is a moving subject in the current image frame, determining a subject area containing the moving subject in the current image frame; and
dividing the subject area through a subject dividing network to obtain the target subject in the current image frame.

14. The method of claim 13, wherein the dividing the subject area through the subject dividing network to obtain the target subject in the current image frame, comprises:
inputting the subject area containing the moving subject into the subject dividing network to obtain a subject dividing image;
obtaining a target binary image of the moving subject; and
fusing the subject dividing image and the target binary image to obtain the target subject in the current image frame.

15. The method of claim 1, wherein the determining the target subject in the current image frame based on the target subject in the previous image frame comprises:
obtaining the subject dividing image or a target binary image of the previous image frame based on the target subject in the previous image frame;
determining a subject area in the current image frame based on the subject dividing image or the target binary image of the previous image frame; and
dividing the subject area through a subject dividing network to obtain the target subject in the current image frame.

16. The method of claim 15, wherein the determining the subject area in the current image frame based on the subject dividing image or the target binary image of the previous image frame comprises:
determining a height and a width of a circumscribed rectangle of the subject dividing image or the target binary image of the previous image frame;
increasing the height of the circumscribed rectangle by a preset height, and increasing the width of the circumscribed rectangle by a preset width; and
determining a rectangle obtained after increasing the height and the width as the subject area in the current image frame.

17. The method of claim 1, further comprising:
when the current image frame does not satisfy the motion state transition condition, inputting the current image frame into a subject dividing network to obtain the target subject in the current image frame.

18. An electronic device comprising a memory and a processor, wherein a computer program is stored in the memory, and when the computer program is executed by the processor, the processor is caused to execute a subject recognition method comprising:
obtaining a current image frame and detecting whether there is a moving subject in the current image frame;
in response to detecting that there is no moving subject in the current image frame, obtaining a motion state transition condition;
when the current image frame satisfies the motion state transition condition, obtaining a target subject in a previous image frame; and
determining a target subject in the current image frame based on the target subject in the previous image frame;
wherein the determining that the current image frame satisfies the motion state transition condition comprises:
obtaining a ratio of a subject dividing image of the previous image frame to the previous image frame;
determining whether there is a moving subject in the previous image frame; and
when the ratio of the subject dividing image of the previous image frame to the previous image frame is greater than a ratio threshold and there is a moving subject in the previous image frame, determining that the current image frame satisfies the motion state transition condition.

19. A non-transitory computer-readable storage medium, having a computer program stored thereon, wherein when the computer program is executed by a processor, a subject recognition method is implemented, the subject recognition method comprising:

obtaining a current image frame and detecting whether there is a moving subject in the current image frame;

in response to detecting that there is no moving subject in the current image frame, obtaining a motion state transition condition;

when the current image frame satisfies the motion state transition condition, obtaining a target subject in a previous image frame; and determining a target subject in the current image frame based on the target subject in the previous image frame;

wherein the determining that the current image frame satisfies the motion state transition condition comprises:

obtaining a ratio of a subject dividing image of the previous image frame to the previous image frame;

determining whether there is a moving subject in the previous image frame; and when the ratio of the subject dividing image of the previous image frame to the previous image frame is greater than a ratio threshold and there is a moving subject in the previous image frame, determining that the current image frame satisfies the motion state transition condition.

\* \* \* \* \*